(12) United States Patent
Todorovic et al.

(10) Patent No.: US 10,499,115 B2
(45) Date of Patent: *Dec. 3, 2019

(54) VIDEO CONTENT SWITCHING AND SYNCHRONIZATION SYSTEM AND METHOD FOR SWITCHING BETWEEN MULTIPLE VIDEO FORMATS

(71) Applicant: Aether, Inc., Los Angeles, CA (US)

(72) Inventors: Nikola Todorovic, Los Angeles, CA (US); Tye Sheridan, Austin, TX (US)

(73) Assignee: Aether, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/018,628

(22) Filed: Jun. 26, 2018

(65) Prior Publication Data

US 2018/0302689 A1 Oct. 18, 2018

Related U.S. Application Data

(63) Continuation of application No. 15/793,508, filed on Oct. 25, 2017, now Pat. No. 10,021,464.

(60) Provisional application No. 62/412,634, filed on Oct. 25, 2016.

(51) Int. Cl.
| | | |
|---|---|---|
| *H04N 5/783* | (2006.01) | |
| *H04N 21/6587* | (2011.01) | |
| *H04N 21/43* | (2011.01) | |
| *H04N 21/44* | (2011.01) | |
| *H04N 21/462* | (2011.01) | |
| *H04N 21/4722* | (2011.01) | |
| *H04N 7/14* | (2006.01) | |
| *H04N 21/422* | (2011.01) | |

(Continued)

(52) U.S. Cl.
CPC ........ *H04N 21/6587* (2013.01); *H04N 7/148* (2013.01); *H04N 21/4221* (2013.01); *H04N 21/4307* (2013.01); *H04N 21/44004* (2013.01); *H04N 21/4622* (2013.01); *H04N 21/4722* (2013.01); *H04N 21/816* (2013.01)

(58) Field of Classification Search
CPC ......... H04N 21/23439; H04N 21/6125; H04N 21/812; H04N 21/23424; G11B 27/34
USPC ................ 386/344, 343, 278, 281, 284, 232
See application file for complete search history.

(56) References Cited

U.S. PATENT DOCUMENTS

| | | | |
|---|---|---|---|
| 10,021,464 B2 * | 7/2018 | Todorovic | H04N 7/148 |
| 2014/0122601 A1 | 5/2014 | Poston et al. | |
| 2015/0026715 A1 | 1/2015 | Bernstein et al. | |

FOREIGN PATENT DOCUMENTS

EP    1912201 A1    4/2008

OTHER PUBLICATIONS

Extended European Search Report dated Jul. 12, 2019 in European Patent Application 17863508.2.

* cited by examiner

*Primary Examiner* — Robert Chevalier
(74) *Attorney, Agent, or Firm* — Joan T. Kluger; Barnes & Thornburg LLP

(57) ABSTRACT

A video content type seamless switching system and method for synchronizing and displaying multiple types of video content in a single platform, such as a single video player, application, or other content player. Illustrative video content type switching may be between 2D and 360 degree formats coordinated by a switching controller. The switching controller may be configured to operate with television displays and associated control components, such as cable (Continued)

boxes, through implementation of the video content switching methods.

20 Claims, 17 Drawing Sheets

(51) Int. Cl.
*H04N 21/81* (2011.01)
*H04N 5/93* (2006.01)

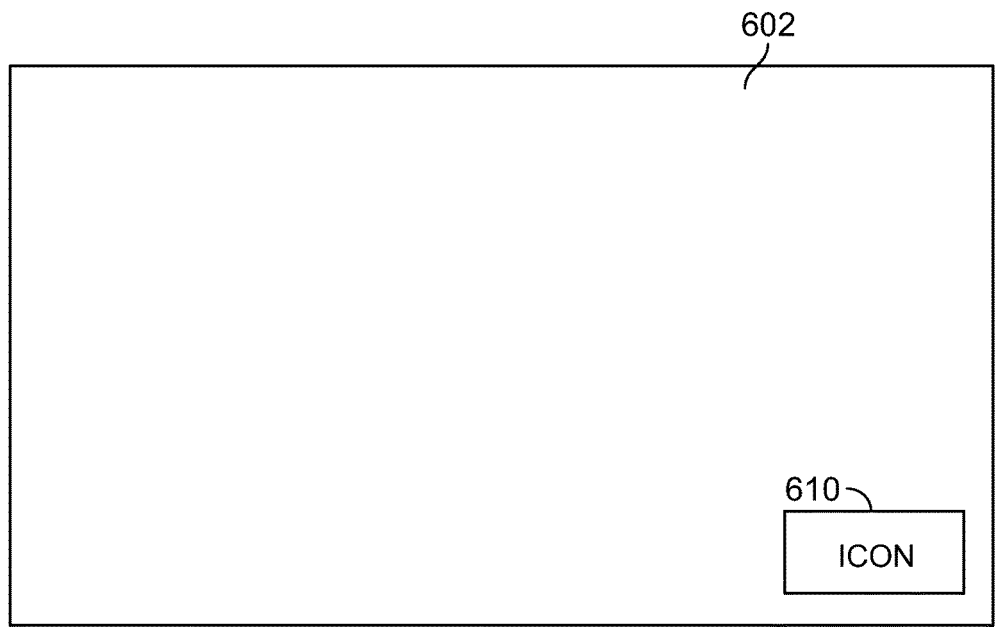
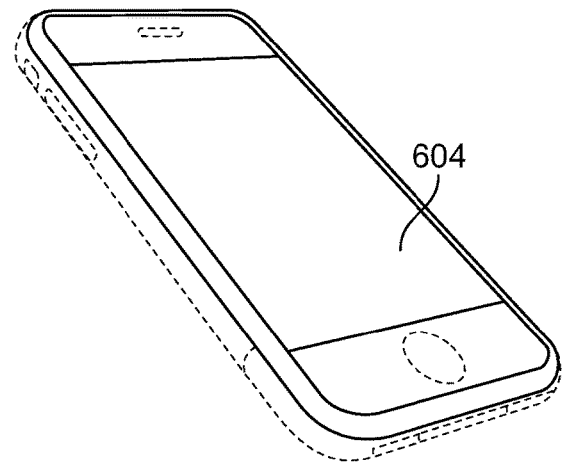
FIG. 6

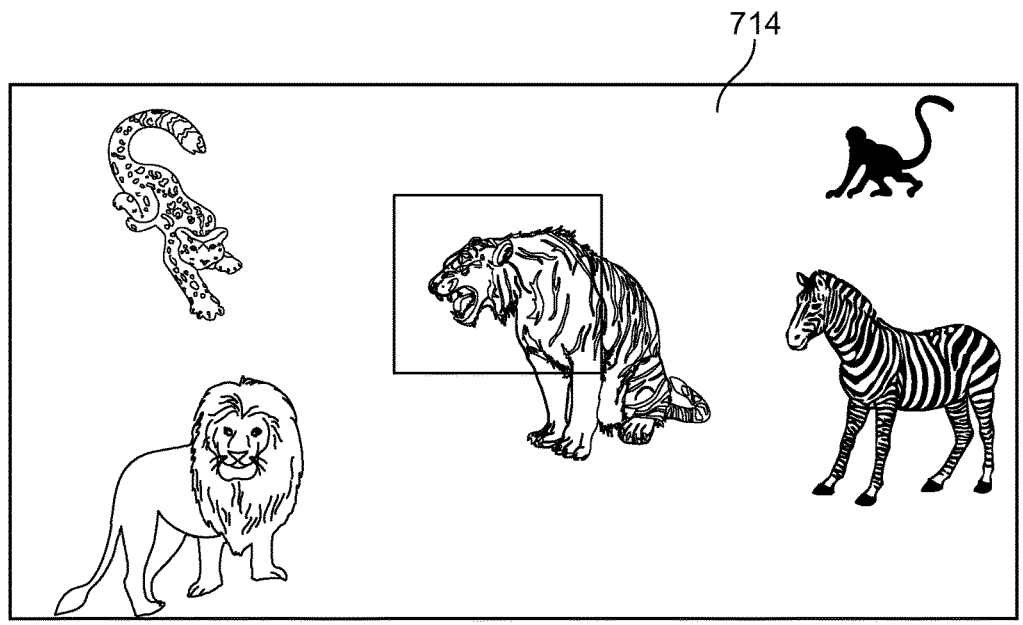
1 - STARTING POINT
2 - TURN BACK (180 Y-AXIS)
3 - TURN LEFT (-90 Y-AXIS)
4 - TURN RIGHT (90 Y-AXIS)
5 - LOOK UP (90 X-AXIS )
6 - LOOK DOWN (-90 X-AXIS )
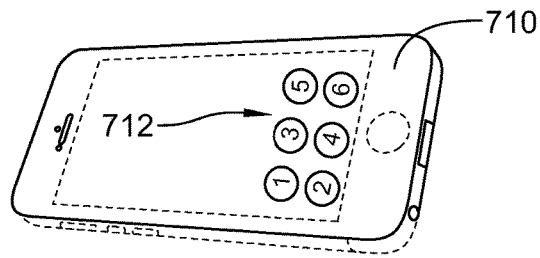
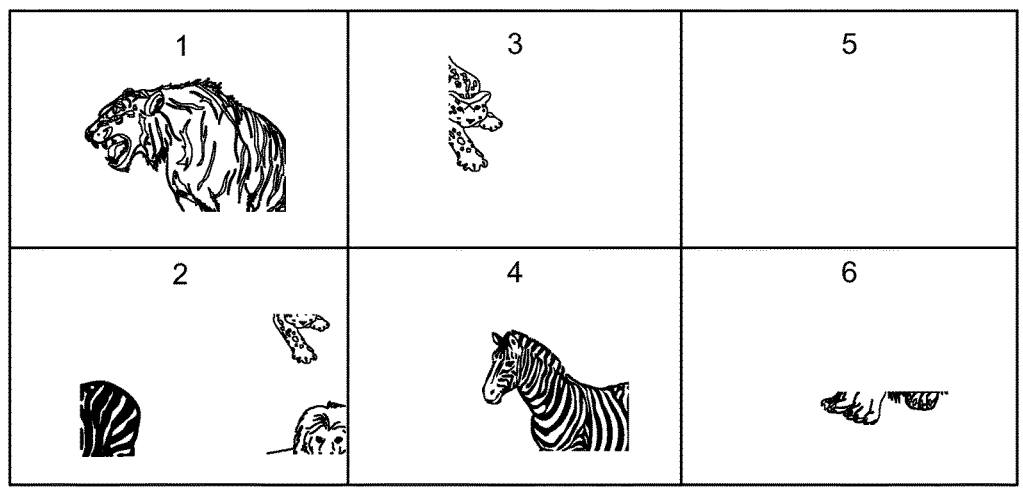
FIG. 13

VIDEO CONTENT SWITCHING AND SYNCHRONIZATION SYSTEM AND METHOD FOR SWITCHING BETWEEN MULTIPLE VIDEO FORMATS

CROSS-REFERENCE TO RELATED APPLICATIONS

This application is a continuation of and claims priority to U.S. patent application Ser. No. 15/793,508, filed Oct. 25, 2017, entitled Video Content Switching and Synchronization System and Method for Switching Between Multiple Video Formats, and claims the benefit of U.S. Provisional Patent Application No. 62/412,634, filed Oct. 25, 2016, entitled Content Switch. The aforementioned patent applications incorporated herein by reference.

BACKGROUND

Recent advances in camera, video, and related computer technology have led to the creation of new types of video content. For example, video content can be generated in two-dimensional video, 360 degree interactive video, three-dimensional video, and/or other formats. Different types of video content are traditionally played in separate types of video content players. For example, two-dimensional video content is typically displayed in a video player configured for 2D playback, such as a traditional media player, streaming video player, and the like. Interactive video content, such as 360 degree video, is often displayed in a separate type of video player or application. Three dimensional video may be played in yet another player or application.

As various types of video content have become mainstream, content developers are now generating related content for the same subject in multiple video formats. For example, a television show, movie, advertisement, sporting event, and/or any other content may be captured in traditional two dimensional video and companion 360 degree interactive video. A user consuming the content may be forced to switch between multiple video players and/or applications—e.g., a video player for the 2D linear video and an application for the 360 degree interactive video. Switching between multiple players and/or applications can be inefficient, time consuming, and inconvenient for a user viewing the content. A single platform configured to display multiple types of video content would be useful.

SUMMARY OF THE INVENTION

Disclosed herein are video content type switching systems and methods for displaying multiple types of video content in a single platform, such as a single video player, application, or any other content player. A content player may be configured to switch from a first type of video content to a second type of video content. In illustrative embodiments, a video player may include a button, switch, toggle, or other switching interface allowing a user to switch between a first type of video content and a second type of video content. For simplicity the term "button" may be used herein to encompass various switching interfaces, but the switching interface can be of any type that is configured to allow the necessary choices and is compatible with other components of the video content type switching system. In an illustrative embodiment, a video player displays traditional two-dimensional (2D) video content (such as a television show, movie, live event, advertising, and the like) and a button (e.g., icon) is displayed allowing the viewer to switch to a second type of content. Additional content types may also be available in the multiple video content type system. When the button is activated by the user, the video player may switch to display a second type of video content, such as 360 degree interactive video content, three-dimensional (3D) content, and/or another type of video content. When the player switches from a first content type to a second content type, features associated with the second content type are enabled in the video player. The video player may seamlessly switch to the second type of video content with minimal to no interruption in the action. The switching interface may later be actuated to switch back to the first type of video content (e.g., 2D video content) or switch to another type of content. In an exemplary embodiment the return to a different video content type or enablement of a particular video content type can occur automatically in response to metafile information associated with the video content. In certain cases, the different types of content may be related. For example, a 2D video and interactive 3D video can depict the same scene of a television show, movie, live event, advertising, or other content. Using the button, a viewer may switch between the 2D video and interactive 3D video versions of the content with minimal interruption to the flow of action.

BRIEF DESCRIPTION OF THE DRAWINGS

The invention is best understood from the following detailed description when read in conjunction with the accompanying drawings. The figures depict illustrative embodiments of the invention.

FIG. 6 is an example of a visual display for video content and a user interface.

FIG. 13 is a further illustrative example of an interface for controlling interactive content comprising a 360° panoramic video.

DETAILED DESCRIPTION

Figure 1:
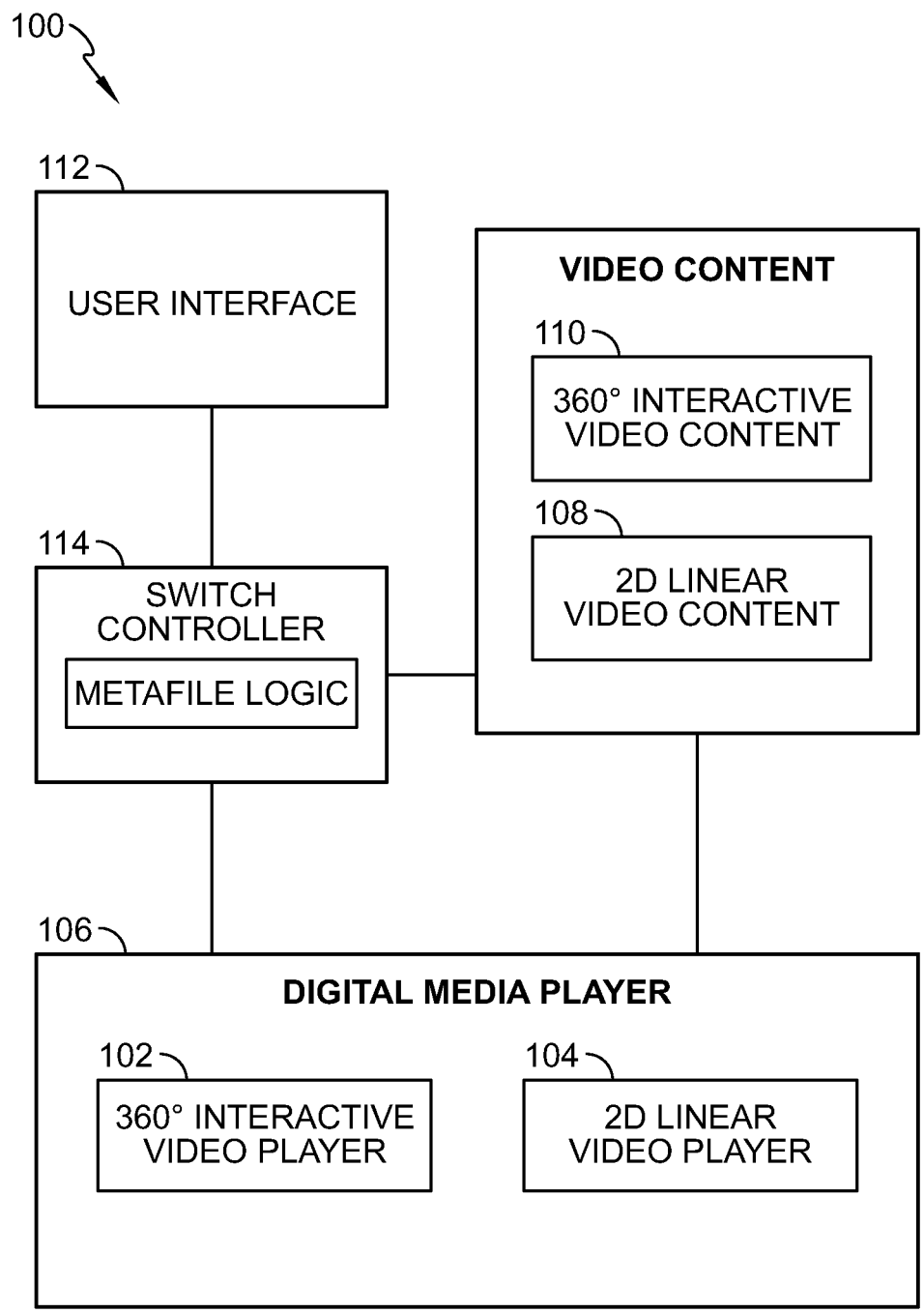
FIG. 1 depicts an illustrative schematic of a video content type switching system.

FIG. 1 depicts an illustrative schematic of a video content type switching system 100. Video content type switching system 100 includes a 360 degree interactive video player 102 and a 2D linear video player 104 combined in, or enabled on, a single digital media player 106. Illustratively the configuration can be a 360 degree interactive video player "living inside" of a traditional 2D linear video player. In an illustrative embodiment, digital media player 106 may include a video player installed on a computer, a media player associated with a TV (e.g., Apple TV, Roku, Amazon Fire TV, etc.), a media player on a mobile device, or any other type of media player. In one example, while playing 2D video content 108 on a media player (e.g., a TV show on a streaming media player), the system can recognize a scene that is additionally shot in 360 degree video format 110 or has companion 360 degree interactive video content. The system may display a button 112 enabling the user to switch back and forth between the 2D video format video, interactive 360 degree video format video, 3D video, or video in other formats.

In an exemplary embodiment, with switch controller 114, switching system 100 recognizes a scene in a parent video of a first content type, such as 2D video format, that is additionally shot in a second content type, such as 360 video format and/or has companion 360 degree interactive video content, by automatically searching and recognizing metadata associated with or contained in the "parent" file (2D video file in this example) or the metadata associated with the "child" file (360 degree interactive video, 3D video, etc.). Initially the system recognizes and sorts 360 degree interactive and 3D video files, or other additional video content files, by analyzing the file type (for example, 360 degree interactive, 3D video, etc.) and extensions the file possesses (for example, MOV, AVI, FLV, ASF etc.). The specific recognition process or use case may vary depending on the particular system, for example.

Switching system 100 contains metafile logic in the form of computer code executed on one or more processors. In a video on demand (VOD) use case, playback of the parent video content provides input in the form of or derived from metafile information associated with the parent video file acted upon by the system's logic. Switching system 100 is configured to seek metadata that indicates if additional file types associated with the parent video file exist, in this illustrative case 360 degree interactive video content. Confirmation is generated to indicate that there is a child file associated with the parent file. This confirmation triggers the system to automatically search for the child video file. For example, the metadata can indicate that the child video file is named the same as the parent file but with "360" at the end. Any nomenclature can be used, provided that the system can match the child and parent video files. In some cases metafile information may be attached to the "child" file (360 degree or 3D video, for example) and the system will search the "parent" (2D video) file to attach the 360 degree video file to it. In some cases, both of the videos will have metafile information attached. In this case the system will just look to match the two metadata files together, which will automatically tie the two video files together.

An illustrative process for preparing video files on which the switching system can act is as follows: A child file, such as a 360 file is uploaded. A parent file is selected to which the child file will be attached or otherwise associated with. The delivery location is selected, which may be for example, the server or a platform on which the parent file and the child will be playing. In one case, it can be AppleTV and the server the app from AppleTV is using. In other instances it can be a provider such as Comcast and the server the server Comcast X1 platform is using. A decision is made as to whether to sync the parent and child file, the extent to which to sync them or whether not to sync the files. The child file is prepared by coding it for viewing with its companion parent file according to any of the methods described herein or to achieve the outcomes as described herein. Once the child file metafile information is properly coded the parent video file and child video file can be played in a coordinated fashion, either automatically, if so synced, or by user input through an appropriate interface. The switching system reads the parent file and can obtain information from the child file via the metadata. To play the video content, the video player must have the same content creator language as what is associated with the video file, or a compatible language. By way of example, the content creator of a 2D television show titled "TV Show S1E1" creates additional content in 360 degree video format and titles it "TV Show S1E1 360". The content creator then decides to enable this additional content on OTT TV platform (for example, DirecTV NOW on Apple TV). The content creator will also select at what minute of the "TV Show S1E1" that "TV Show S1E1 360" will show up and what happens when the user selects and watches the 360 video content. The metafile is generated and attached to either the parent or child video file (or both). This metafile will be written in the coding language associated with the media player and SDK logic on the Apple TV or other platform. The files will then be uploaded to the server from by the DirectTV NOW streaming its content. The switching system then looks for the metafiles.

In illustrative embodiments, a show, movie, or other video content may include interactive video allowing a user to engage with the content. In an illustrative example, a murder mystery show shot in 2D video format may include a companion 360 degree panoramic video allowing the viewer to engage with the show and solve the mystery. For example, during crime scenes the viewer may have the option to select via an interface, companion 360 degree video content, which would turn the crime scene into an interactive 360 degree video where the viewer could "look" around the scene and search for clues. The viewer can "look" around the 360 degree video scene by using a control device, such as a television remote, a remote associated with a media player, a mouse, a mobile device, or other controller or interface. For example, with each directional swipe, the viewer may focus the view around the entire 360 degree video, giving the viewer the impression of controlling the camera with their remote control. Using this interface, the viewer can become the detective and solve the murder mystery before it is revealed in the video presentation of the show. Various forms of directional input to the control device may be used. Although "swiping is referred here, directional input may be by various physical buttons or touch screen button, and any other input mechanism compatible with the control device used. A standard television remote control may be used if the system is configured using a video cable box, for example.

In a further embodiment, once the viewer is finished exploring the 360 degree interactive video, a click of a button (e.g., icon in the video player display, a touch icon, etc.) will display the same scene shot in regular 2D linear video in the same display interface. The viewer may continue watching the 2D video content in the same video interface, without having to switch to a separate application or other interface.

In traditional non-interactive video players, the viewer does not have the ability to interact with the show and completely depends on the content to reveal whatever mysteries the show holds. For example, the only options the viewer has to interact with the content is to rewind scenes, fast-forward through scenes, enter slow-motion video, otherwise manipulate the 2D video, or switch to another application or player to view supplemental content.

In various embodiments, the techniques disclosed herein allow viewers to switch relatively seamlessly between a 2D linear viewing experience and a 360 degree interactive viewing experience and choose the point of view of the action. A viewer is provided with an immersive experience from a single media player. Using the techniques disclosed herein, there is no longer a need to switch to another application, switch to a computer, or activate another video display platform to enjoy all that virtual reality (VR) content technology has to offer. By the press of a button or other input, a user can switch from traditional video formats to immersive video where the user can navigate the action and select which aspects of the action to watch. Using the techniques described herein, the viewer no longer is confined to passively watching the scene, movie, sporting event, advertisement, or other content unfold. Instead, the viewer can now enter a scene and essentially look around and choose what to look at. This enhanced functionality has the potential to transform the creative aspects of any viewing experience for both creators and the consumers.

Figure 2:
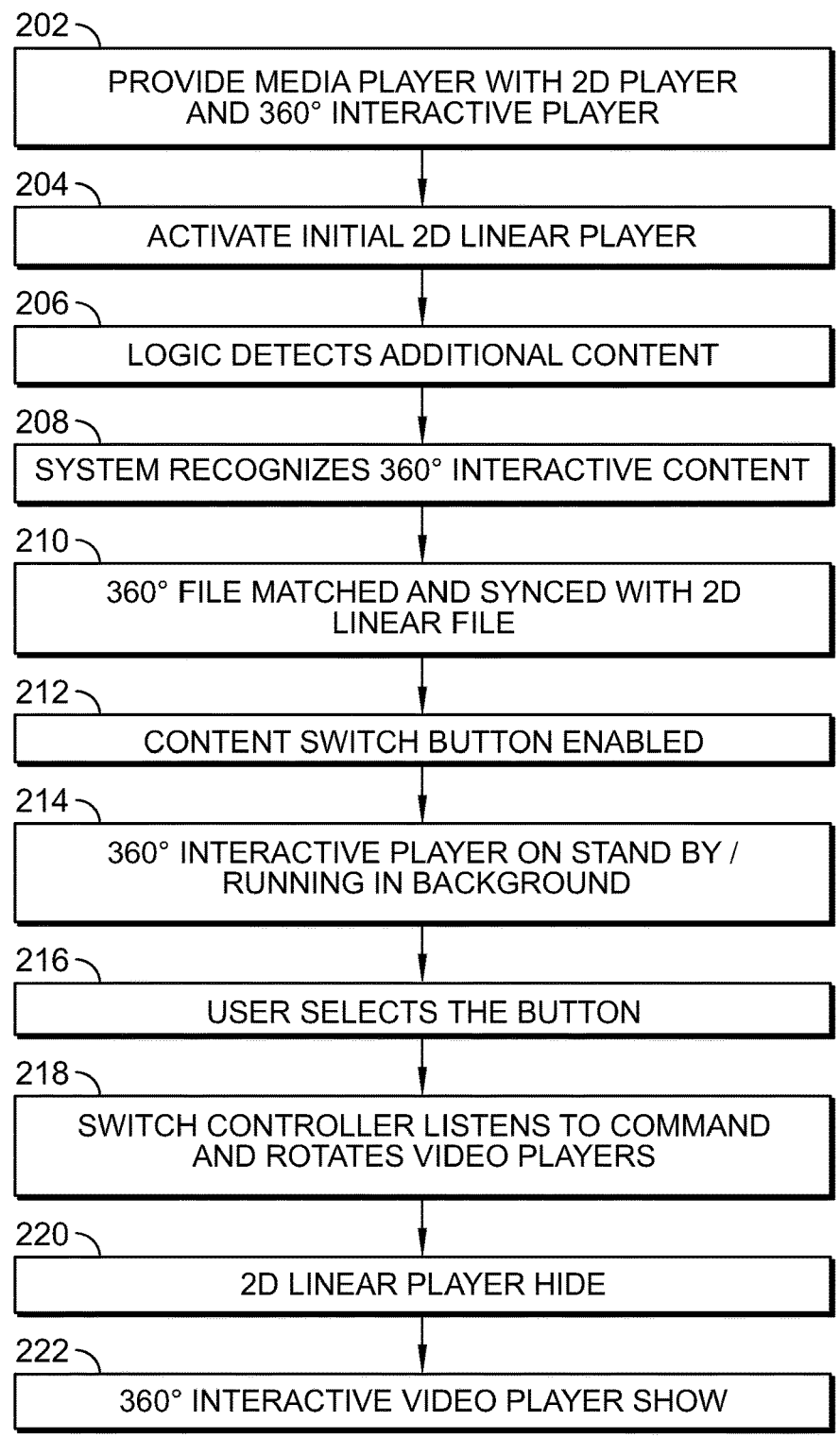
FIG. 2 is a flow chart illustrating switching between video content formats.

FIG. 2 depicts a video content type switching method according to an illustrative embodiment wherein the system switches between a parent 2D video file and a child 360 degree interactive video file. The system includes one top media player, which underneath combines a linear 2D player and 360 interactive player, or other video format players. Switching between formats is accomplished by the switching system "hiding" a 360 degree interactive player inside of a linear 2D player and with logic and content switch options making the final product user experience be that of a single media player. The combined media player is provided in step 202. In step 204, a 2D or other parent video player is activated. In step 206 the system, through coded logic detects additional video content, if available. In step 208, the system, via metafile information, finds the additional video content. The interactive video file is then matched and synced with the linear video file in step 210. This enables the content switch button in step 212, which is a command for the 360 degree interactive player to be on standby and in some cases pre-buffer the interactive content in step 214. Once the user selects the content switch button in step 216, a switch controller receives a signal to rotate to the child video content in step 218. This causes the parent, 2D linear player to stop and "hide" in step 220 while the child, 360 degree interactive player, will "show" and play the interactive content in step 222. The switch is essentially the rotation between the two players that are combined underneath the overall media player. Because the rotation is in the background, the end switch may be seamless to the user. The "switch controller" is listening to user input that signals which of the two video content types it would like to play, and based on that input, enables (shows) the video player and content to match the content type and disables (hides) the other video player and content. The switching system achieves this by putting the selected video player on top of the other player, thereby only making one video player and content type visible to the user at a given moment.

In exemplary embodiments, the techniques described herein may change the way media are consumed on television. Television may become more interactive, paving the way for 360 degree video, VR, augmented reality, and other types of content to more naturally be displayed on television. Multiple forms of content may be available for the viewer by a simple click of a button. The techniques disclosed herein may also overcome difficulties in marketing interactive 360 degree video, VR content, 3D video, or other video content by allowing multiple content formats to live inside of an episode of a TV show, movie, live event, advertisement, or any other video content.

Methods and systems described herein and their equivalents can be applied to advertising content. The system may include an advertising and marketing component. Advertisers will be able to provide a traditional advertisement and give the viewer the opportunity to enter the action. Prior to the advent of the techniques disclosed herein, VR, 360 degree video, and 3D video technology were typically used for short promotion items sought out by consumers on a computer, mobile device, VR headset, and the like. Using the techniques disclosed herein, an immersive 360 degree advertisement can be aired on television, and the advertiser or content provider can allow for some or all of the promotion to be in 360 degree video. In certain cases, using the content switch button, the viewer can click, or otherwise provide input, and interact with the promotional content. The user may seamlessly return to the 2D video broadcast the user was watching. The methods and systems disclosed herein provide syncing and file matching to produce this seamless viewing experience. In this manner a viewer may not realize they have left the 2D video content they were watching. Additional details on applying the technology to advertisements will be described below.

In further embodiments, the switching systems and methods disclosed herein can be applied to live events. For example, a viewer watching a sporting event may be able to switch between 2D video and interactive 360 degree video of the event. The viewer can control their perspective. If the viewer wants a different view of the action, they can enable a 360 degree interactive video or another interactive video feed and control their vantage point for watching the event. These techniques could be similarly applied to other live events, such as news events, weather broadcasts, or any other live events.

Figure 3:
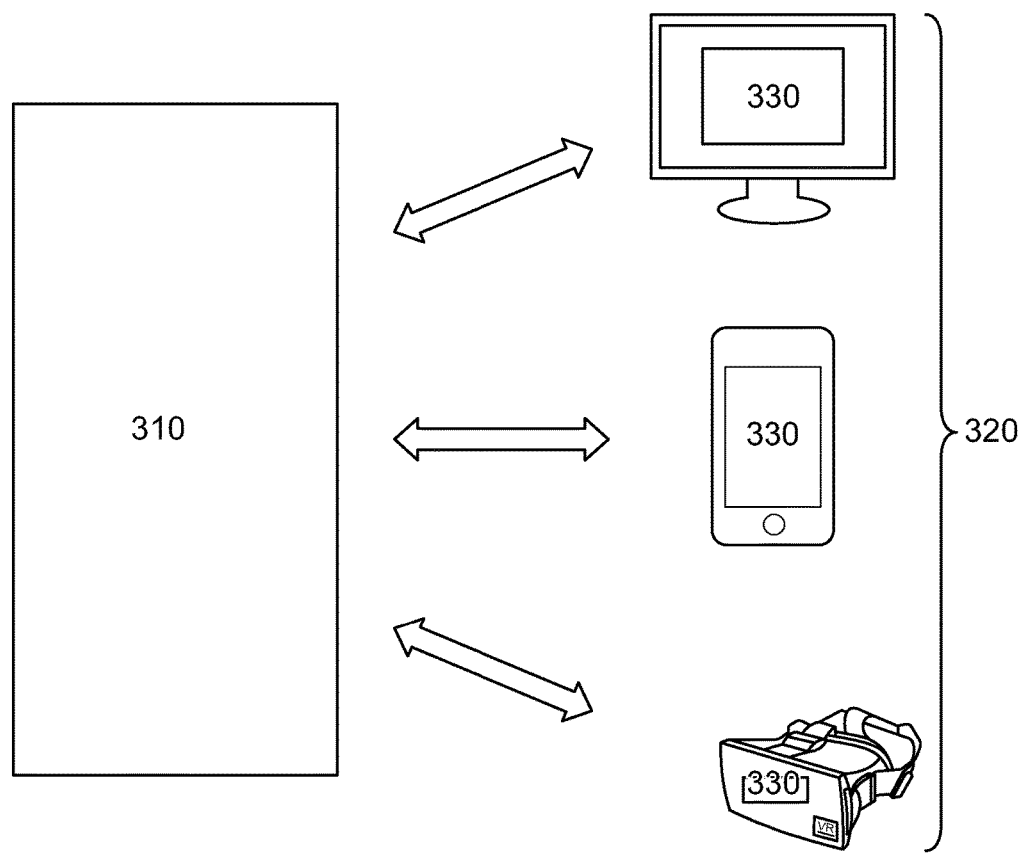
FIG. 3 is a block diagram illustrating embodiments of a system to display multiple types of video content in a media player.

FIG. 3 is a block diagram illustrating embodiments of a system to display multiple types of video content in a media player. In the example shown, a server 310 may communicate with various devices 320, such as televisions, mobile devices, virtual reality headsets, and/or any other devices capable of displaying video content. Server 310 may store video content. The video content may include video in multiple formats. For example, server 310 may store video content for a television program, movie, live event, or any video content in multiple formats, such as 2D video, interactive 360 degree video, 3D video or other video formats. The video in multiple formats can be streamed, or otherwise transmitted, to the various devices 320. In certain cases, a video player 330 (e.g., streaming, video player) associated with a device 320 may retrieve the video content in various formats from server 310. For example, content playback may be initiated in a streaming video player 330 in a first format, such as 2D linear video. The 2D video may be retrieved from server 310, buffered, and displayed in a streaming video player 330 on device 320. A user may provide input (e.g., press a button) in streaming video player 330 to switch to a second video format, such as 360 degree interactive video content. Upon receiving the input, streaming video player 330 may request (pull) the second video content from server 310. The second video content may be provided to streaming video player 330, buffered, and displayed in the streaming video player 330.

In various embodiments, a video player 330 may switch from a first format video (e.g., 2D linear video) to a second format video (e.g., 360 degree interactive video) in such a manner that minimal or no interruption in the progression of the video playback occurs, for seamless or near seamless play. As used herein "seamless" means that a viewer is not aware of the transition. In one example, after receiving a command to switch from the first video format to the second video format, the video player 330 may immediately request the second format video from the server 310. While the second format video is buffered at the video player 330, the first format video may continue to play. When the second format video is buffered or partially buffered and ready for display, the video player 330 may switch to display the second format video. By delaying the switch from the first format to second format video until the second format video has sufficiently been buffered, video playback may be seamless. In another example, multiple video formats may be simultaneously streamed from server 310 and temporarily stored at video player 330. In this case, when a command is received to switch from a first video format to a second video format, the second video format will be ready for playback. The timing of the switching process is described in more detail below. A video may be sufficiently buffered in 2-3 seconds, for example, or additional time may be required. In illustrative embodiments, when the system has leftover buffering capacity from the parent video file, it can pre-buffer the child file. For example, if a television show is 45 minutes long and it takes three minutes for the player to fully buffer it, after three minutes the player will automatically buffer any child video content that is synchronized with the parent video content.

Figure 4:
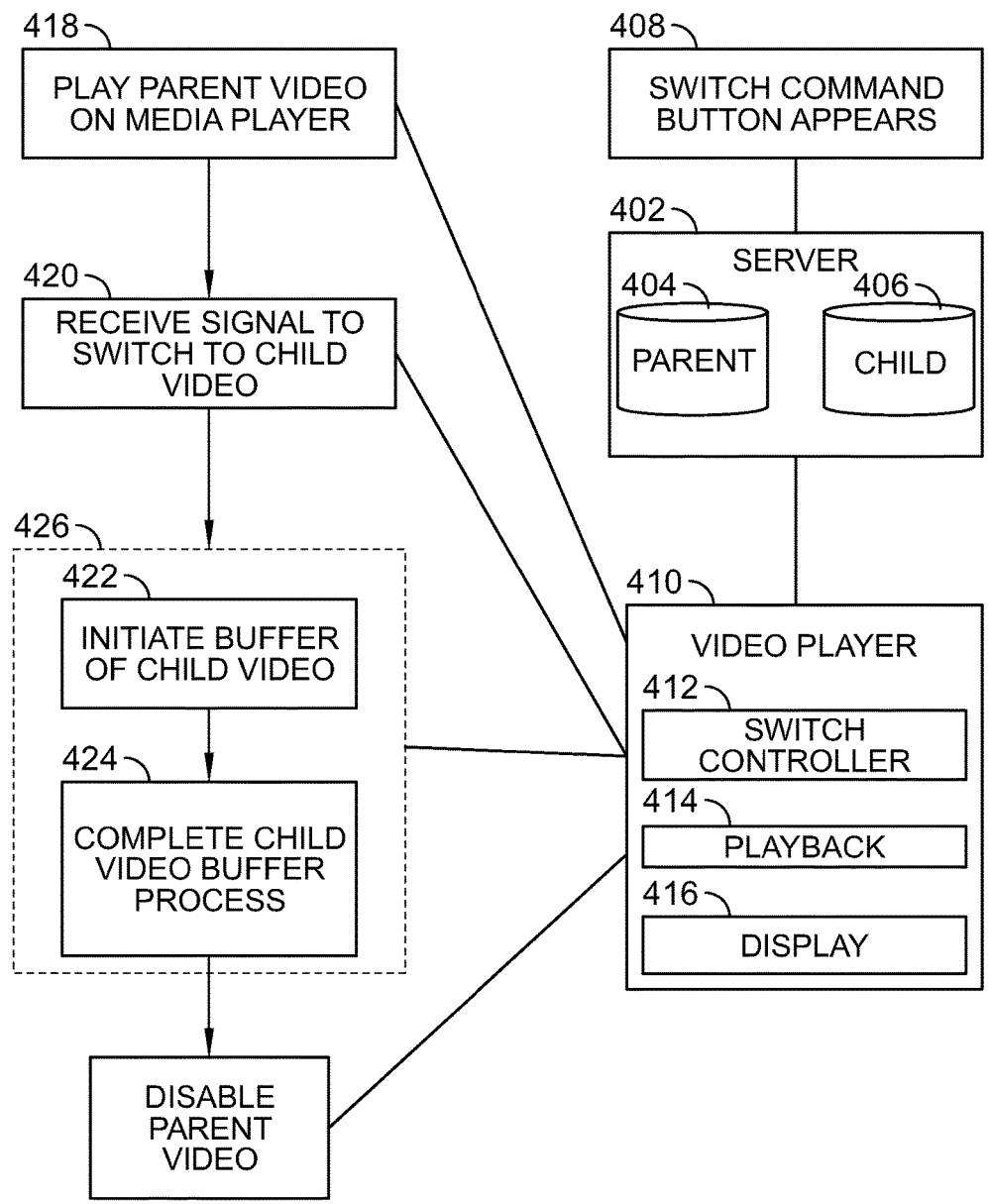
FIG. 4 is a flowchart depicting switching between a first and second video content format with a delay while the second video content is buffered.

FIG. 4 is a combination flow chart and block diagram showing an illustrative process for switching between video content wherein switching is realized after the initial video content is buffered, by a video player, for example. A server 402 stores parent 2D video content 404 and child 360 video content 406, or other parent and child video content. Server 402 receives a switch command from a user after a switch command button appears in block 408. A switch controller 412 acts on a video player 410 to govern which video content is played. Switch controller 412 may be integral with video player 410 or may be a peripheral component functionally connected to video player 410. This too can be the case with other components described herein as being within or external to another component. Although, it is contemplated that the various video players configured to play different video content types are housed in the same video player and functionally connected by a switch controller. Playback as depicted by block 414 may also be performed or contained in video player 410. Similarly, display 416 may be contained in video player 410.

In the illustrative embodiment shown in FIG. 4, if parent 2D video 404 is playing as in step 418 and a switch command 408 is received by server 402 as in step 420, server 402 switches to a child 360 degree video 406. A buffering process takes place in block 426. Buffering of child video content 406 is initiated in block 422. Buffering of child video content 406 is completed in step 424. If switch controller 412 implements the switch immediately, there would be a delay between a user viewing the 2D parent and 360 degree child videos while the 360 degree child video content is buffered. Instead, the switch command button only appears when using it will result in a seamless transition between the parent and child video content. Any buffering time period is thus not apparent to the viewer and does not cause a gap in video content viewing. Therefore, in block 426 before switching is completed to child 360 degree video 406, child 2D video 404 continues to play.

In various embodiments, a video player 330 may include multiple video players or code for multiple video players. In some instances, a video player 330 may include code for multiple types of video players. For example, each of the video players may include methods or routines in the video player 330 code. In certain cases, each of the multiple video players may be configured to play a different type of video content. A first video player may be configured to play traditional 2D video, a second player may be configured to play 360 degree interactive video, a third video player may be configured to the play 3D video, and so on. In some cases, only one video player is active (e.g., in the foreground) at a time. For example, when 2D video content is displayed, other video players (such as 360 video players, 3D video players, etc.) may be inactive to conserve processing resources. In another example, the other video players may operate in the background to prepare content for playback in the event the user activates that type of video content. For example, inactive video players can continuously retrieve and buffer video for display, so the player can relatively seamlessly switch between video content types without interruption.

In additional illustrative embodiments, a video player 330 is configured to determine a type of video that is streamed from or otherwise transmitted by server 310, retrieved for playback locally, or otherwise cued for playback. Based on the determined type of video, video player 330 may activate an appropriate video player or appropriate video player features. For example, if it is determined that 360 degree interactive video is to be played, a 360 video player or features configured to play 360 degree video are activated. If it is determined that the 2D linear video is to be played, a 2D video player or 2D video player features are activated and other features may be deactivated. In certain cases, a video player 330 may determine a type of video based on the file format of the video, metadata associated with the video, an evaluation of the video content, or based on other attributes.

Figure 5:
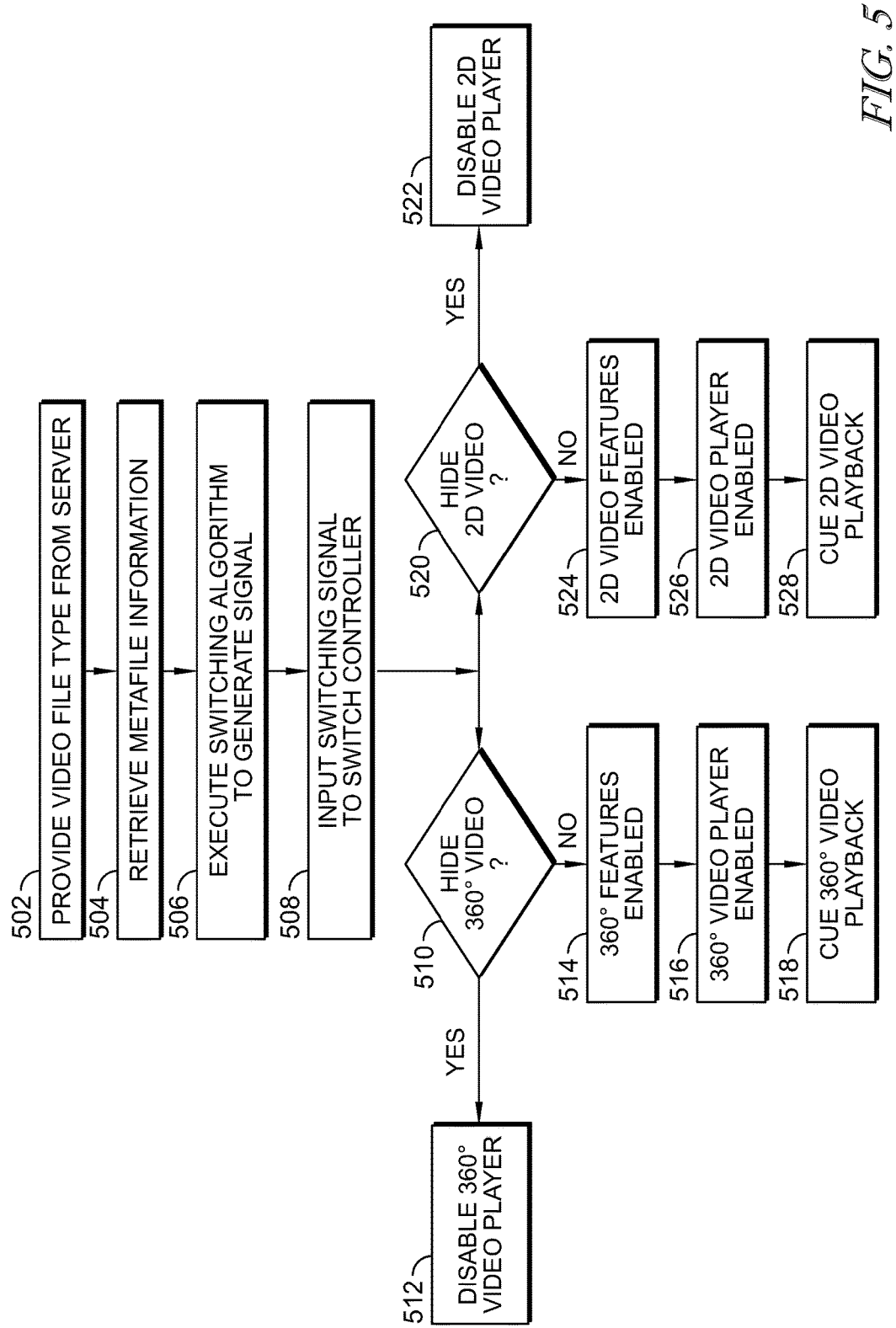
FIG. 5 illustrates a process for determining the type of video to be provided from a server.

FIG. 5 is a flow chart showing a process for determining the type of video to be provided from a server. In step 502 a server provides a video content file. In step 504 a metafile is retrieved from the video file. Using the metafile, which may include metadata and synchronization information, for example, a switching algorithm (logic) is executed to generate a switching signal in step 506. The switching signal is input to the switch controller in step 508. Based on the metafile information, the switch controller determines in block 510 whether to hide the 360 degree video. If the switch controller determines the 360 degree video should be hidden, then the 360 degree video is disabled in step 512. If the switch controller determines the 360 degree video should not be hidden, then the 360 degree video features are enabled in step 514, the 360 degree video player is enabled in step 516 and the 360 degree video is cued to playback in step 518. Steps 514, 516 may be initiated in any order or concurrently. Based on the metafile information, the switch controller determines in block 520 whether to hide the 2D video. If the switch controller determines the 2D video should be hidden, then the 2D video is disabled in step 522. If the switch controller determines the 2D video should not be hidden, then the 2D video features are enabled in step 524, the 2D video player is enabled in step 526 and the 2D video is cued to playback in step 528. Steps 524, 526 may be initiated in any order or concurrently.

FIG. 6 is an example display of interactive content according to various embodiments. In the embodiment shown, a video player associated with a television displays a first type of video content, such as 2D linear video. In the display 602, an icon 610 (e.g., icon stating "360°") or other indicator can be displayed to allow the user to switch to another video format. The user may select the icon 610 using illustrative input device 604, and in response, the video player can switch from the first type of video content to a second type of video content, such as 360 degree interactive video. When the player switches to the second type of video, the features of a video player configured to display the second type of video are activated. For example, upon switching to 360 degree interactive video, the video player may be configured to receive touch input from a control device, such as a remote, mobile device, or other input device. Other features relevant to the 360 degree interactive video may also be revealed.

Examples of features relevant to 2D video content include playback, fast forward, rewind, pause and stop. Additionally, access and return to and from another video format button may be provided.

Figure 7:
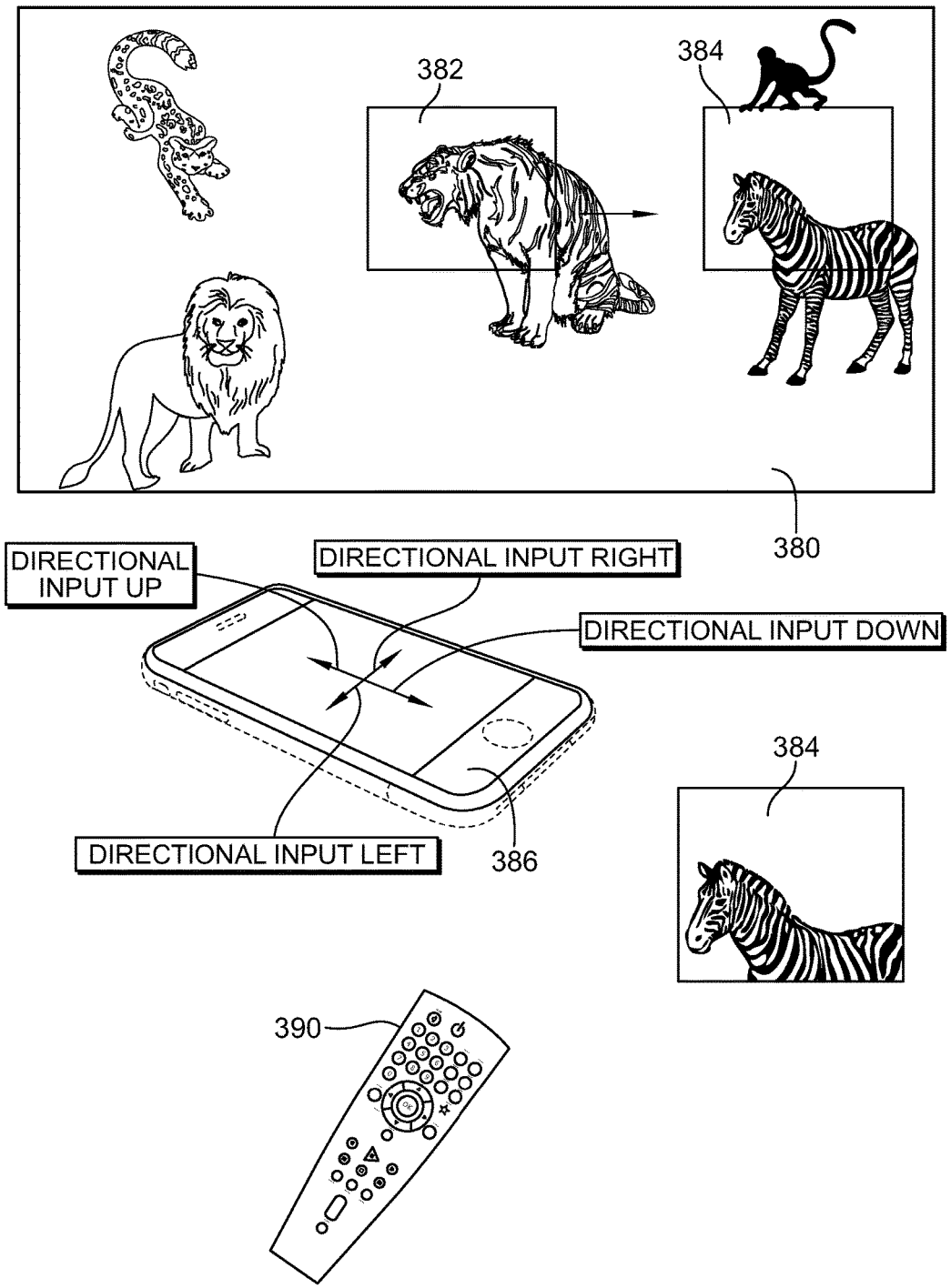
FIG. 7 is an example of an interface for controlling interactive content in a 360° panoramic video.
Figure 8:
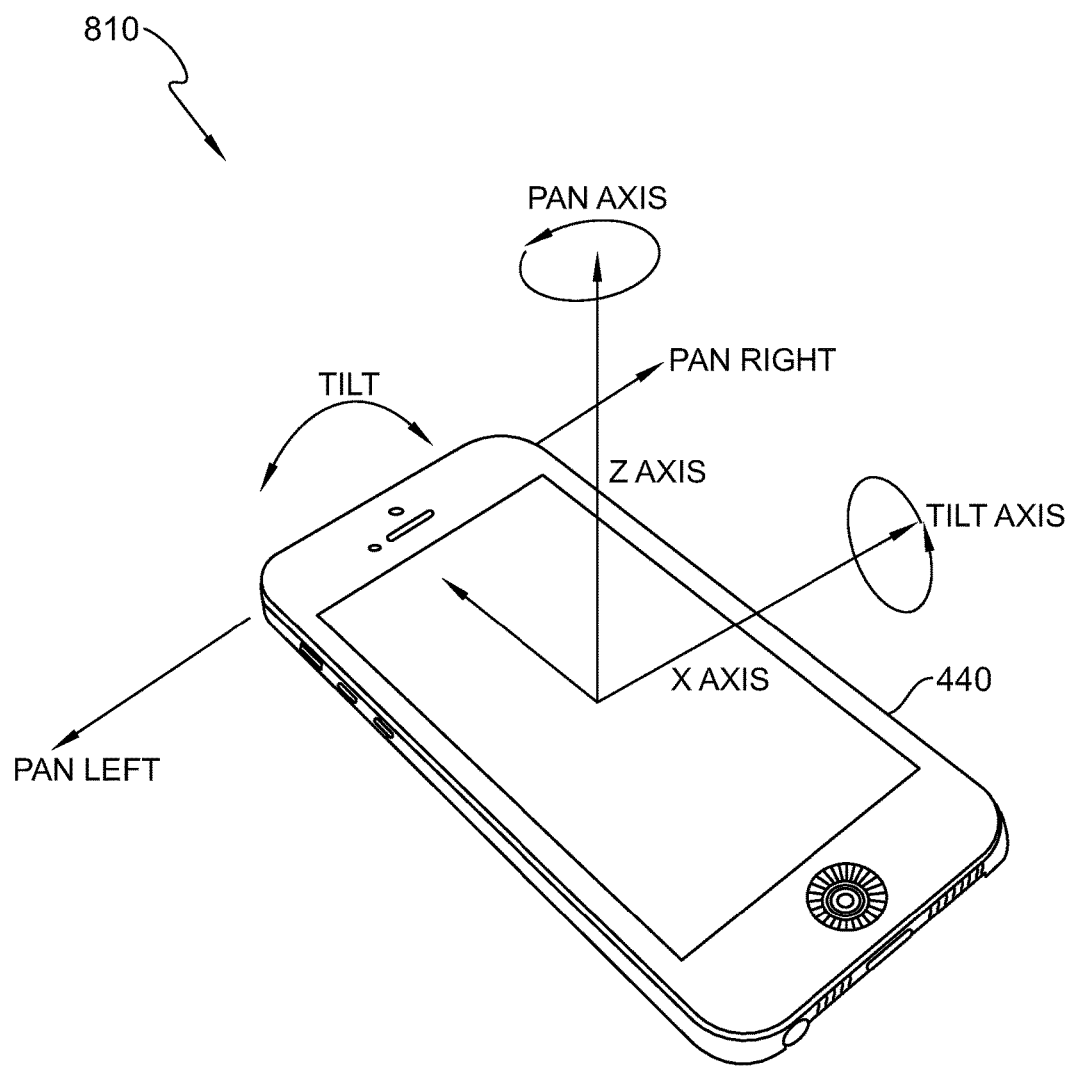
FIG. 8 is an example of a device for controlling interactive video content.

Examples of features relevant to 360 degree video content include playback, fast forward, rewind, pause, stop and 360 degree video navigation (see FIGS. 7 and 8 for example). Additionally, access and return to and from the previous video formats may be included.

Examples of features associated with 3D video include playback, fast forward, rewind, pause, stop, access and return to and from the previous video format, 3D video rotation (see for example FIGS. 7 and 8). If 3D video rotation is enabled it may be configured to rotate around an object, unlike panoramic image navigation.

In illustrative embodiments, icon 610 or other switching mechanism or interface for switching between types of video content may only be displayed at certain times. In illustrative embodiments, icon 610 may be available only when additional video content is available. By way of example, video content (e.g., a television show, movie, advertisement, etc.) may be recorded in two types of video formats, each of a different duration. For example, a first type of video content may include 2D video covering the entire length of television show, movie, advertisement, etc. A second type of video content, such as 360 degree interactive content, may be related to shorter portions of the television show, movie, advertisement, etc. The second video content may include bonus footage. The second type of video content may include, for example, short portions of content associated with particular scenes in a television show. As the first video content plays, the video player may evaluate either continuously or at intervals, whether a second type of video content is available. When a second type of video content is available for display, icon 610 or other mechanism or interface is revealed that enables the viewer to switch between video types. The viewer may click on icon 610 or provide other input to switch the video content from a first type of content that is currently displayed to a second type of content. In certain cases, the player may automatically switch between video in a first format (e.g., 2D linear video) and video in a second format (e.g., panoramic video).

In some embodiments, a first type of video content can be synchronized with a second type of video content. For example, a television show may be filmed in two dimensional video, 360 degree interactive video, or other formats. Video content in multiple different formats can be time synchronized. In certain cases, a playback duration (e.g., time elapsed, time remaining, etc.) may be synchronized across multiple types of video. For example, a television show may include 2D video capturing the duration of the show and 360 panoramic video for particular scenes in the show. The time or playback durations of the two video formats can be synchronized so that a video player can switch back and forth between the two video formats without substantially disrupting the temporal flow of the content. A viewer may be able to switch from a first video format playback (e.g., 2D video) at a certain time to a second video format playback (e.g., 360 degree interactive video) at that same time. In one example, a 2D video of a television show is displayed from time 0:00 to 1:21 when a user provides input requesting a switch to 360 degree interactive video. The 360 degree interactive video may then begin playing from the same time 1:21, which may be a master or universal time between the two formats. The user may later switch back to the 2D video at 2:45, and the 2D video will begin at that time in the television show. The user may later switch to three-dimensional video at 6:34, and so on. The techniques disclosed herein may provide seamless transition between video content formats without interrupting the playback of the video.

Illustrative Examples of Content Switch Metadata Types Include:

Video on Demand (VOD) with a single timed 360 video content;

VOD with a non-timed 360 degree video clip;

VOD with multiple timed 360 video clips;

VOD with parallel equal length 360 video clips;

Live video with multiple 360 video clips; and

Live with a parallel 360 feed.

Illustrative "non-customized" or vanilla 360 video experiences include video content not timed to video on demand and video content timed to VOD. In the non-timed scenario, child video content is launched, the entire content or clip is played, and the viewer returns to the same spot in the parent video as when the child video content was initiated. In the video content timed to VOD scenario, a child video is launched and then return to the parent video is offset by the child time duration.

By way of example, in the non-timed scenario, the parent video is run for five minutes. At the five minute mark, the child video is launched. The child video runs for its full duration or until a user initiates a switch back to the parent video content. When the parent video is resumed, it resumes at the five minute mark.

In a timed scenario example, the parent video is run for five minutes, the child video is launched and run for two minutes. When the parent video is again enabled, it begins at the seven minute mark to accommodate the two minute offset associated with the child video content.

Based on the above two scenarios, or in place of them, a system can be configured to allow the child video clips to serve as branching points to allow a "choose-your-own-adventure" experience, or other similar viewing or participating experience. This is possible by the flexible metafile information, for example (clip_launch_offset_by_parent_return_to_time), which allows implementation of one or more 360 format video or other additional video content as branching points from the "vanilla" or non-customized scenarios.

The decision of which of the two use cases above are being executed will be controlled by the communication between the metadata or other information associated with the video files and the logic behind the content switch system, i.e. content switch algorithms. As used herein, "algorithm" may be a single algorithm or multiple algorithms to carry out the desired function. Multiple algorithms may work in conjunction with one another or separately, depending on their function. Content switch system logic will "listen" to the metafile information, which will provide, 1) the use case being practiced; 2) the duration of the parent file in relation to additional content file(s) and 3) the point in time in the parent file that additional files should appear.

The synchronization between the times the two files will be executed by the content switch algorithm using the universal clock that runs independently of which file is occupying the playback. The universal clock follows the two "clocks" (for example, 2D video time and additional content time) and matches or mismatches the playback time, depending on the use case scenario, such as those described above.

For content switch formats to appear seamless, the system may anticipate the additional content availability and start the buffer of the additional video content file ahead of the appearance of the content switch button. Thus, once the user selects the content switch, the playback of the additional content will be instantaneous or near instantaneous.

If no start-end time of the additional content is associated with the video content (such as in the metafile of the video content), the system will enable access to the additional content for the full duration of the "parent" content.

Figure 9:
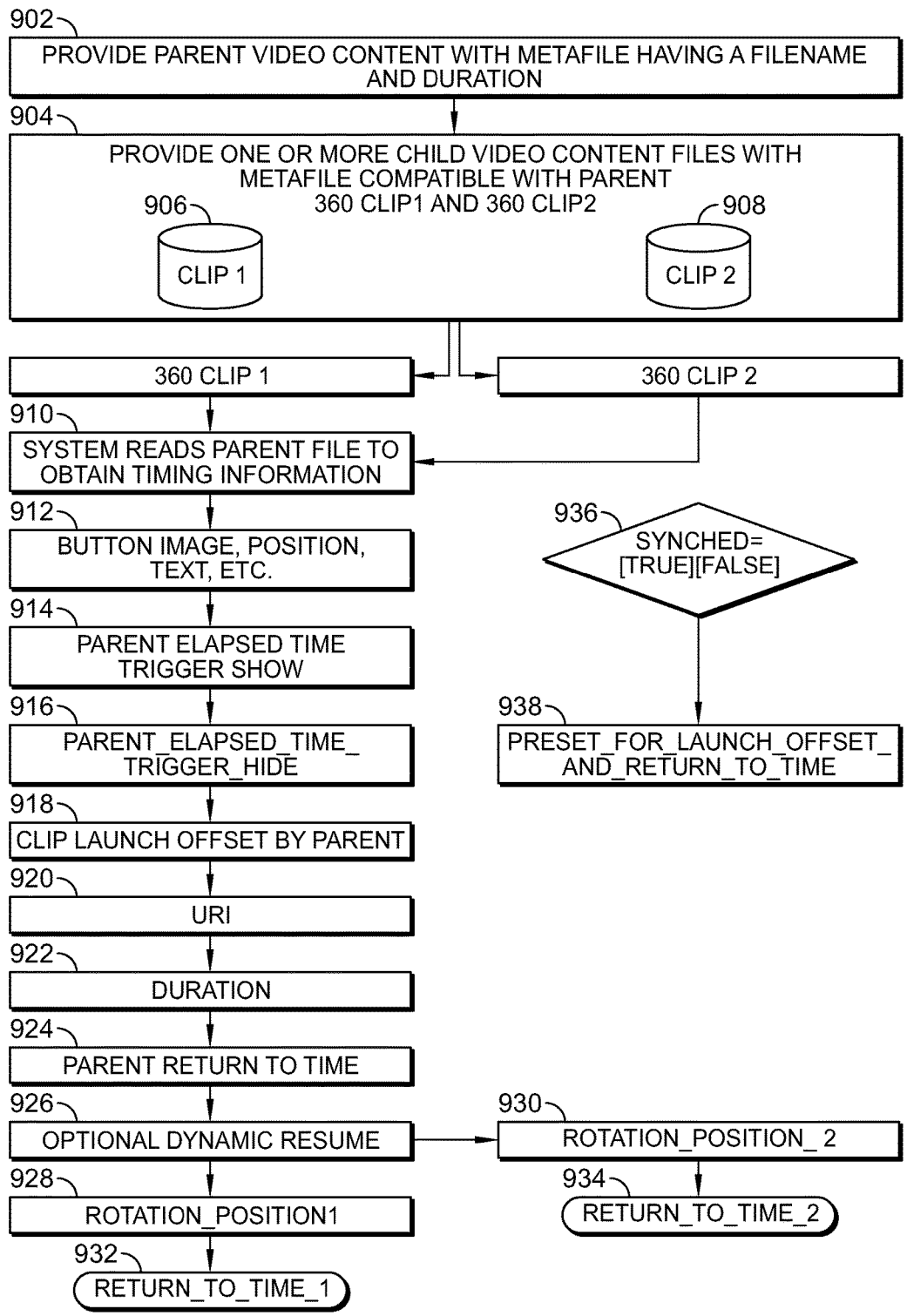
FIG. 9 is a flow chart showing switching between video content types with multiple child video clips.

FIG. 9 is a flow chart showing an illustrative embodiment of a parent file, such as a VOD file, and two child 360 degree video content files. In step 902 a video content file is provided, referred to as the parent file in this example, with a file name and a duration embedded in its metafile. Further provided, in step 904 are child video clips 906, 908. If video clips 906, 908 are synched with the parent video, they will launch according to a timing schedule, which is embedded in the video files in the form of metadata or other metafile code. See FIG. 10, for example, which is described below. To launch one of video clips 906, 908 the system reads the parent file to obtain timing information in step 910. In step 912, the system determines how much time into the parent file video clips 906, 908 should launch. In step 914, the parent video is in progress, i.e. it is showing. In step 916 the system has recognized that child clip 906 or 908 should be launched and the parent video hidden. In some embodiments, the process of hiding the parent video and showing the child video is either not automatic, or the automatic timing can be overridden by the user. In step 918 there is an offset, which may be implemented to prepare the currently hidden video for launch, such as by buffering it. Step 936 reflects the system logic that seeks to determine whether the parent and child video content is synced. If it is synced, then in step 938 the hidden video content is prepared for launching during an offset time period, and upon completion of the currently-running video content, the player hides that video content and shows or returns the user to the previously-hidden video content by causing it to show.

In the illustrative of case in FIG. 9, video clips 906 or 908 are accessed through the cloud in step 920. In step 922 the child video duration ends and in step 924 the parent video resumes playing.

As further shown in FIG. 9, optionally in step 926, a user may select a "choose-your-adventure" experience by opting for one of two or more paths. In this illustrative example, the current video has two different positions, position 1 and position 2, identified in the video images. For example, position 1 may be associated with a door and position 2 may be associated with a staircase. A user can select between rotating to position 1 in step 928, which will take the user through the door, or position 2 in block 930, which will take the user up the staircase. Once a branch is selected, the associated video content will launch. Automatically upon completion of the selected video content adventure, or when chosen by the user, the position 1 video content adventure or the position 2 video content adventure will end, and the player will return to the parent video content in steps 932 or 934, as the case may be. A user may also have the ability to select to which time point in the parent video to return to. For example, by selecting rotation to position 1, the viewer is taken to a time "X" (for example, 8 minutes) in the parent video and by selecting position 2, the user is taken to time "Y" (for example, 14 minutes) of the parent video.

It is noted that the steps shown in FIG. 9 and other flowcharts described herein, in some instances, may be carried out in a different order or concurrently.

Figure 10:
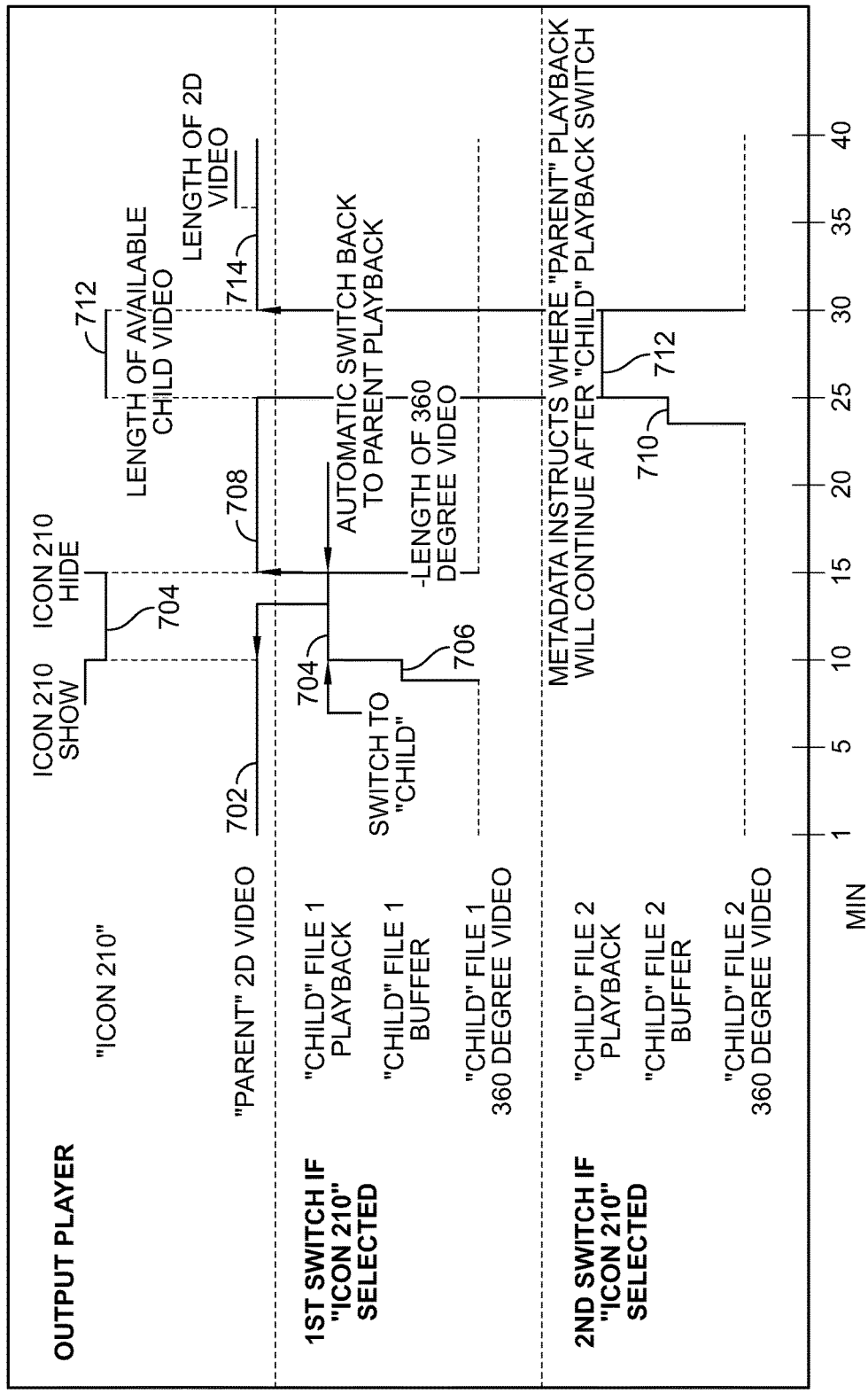
FIG. 10 is a timing diagram depicting the timing of a parent video file and two child video files.

FIG. 10 is a timing diagram illustrating a player switching between a first child video content file and a second child video content file. Parent video content is displayed for a first play duration 702. Parent video content is then hidden during a second play duration 704. During second play duration 704, a first child video content is displayed. Note that prior to play duration 704, the first child video content is being ramped up for display during offset period 706. During offset duration 706, the first video content file may be buffered or otherwise prepared to run. At the end of second play duration 704, the parent video content is returned to for playback over a third play duration 708. At the end of third play duration 708, a second video content file is accessed. The second video content may be prepared during offset duration 710, such as by being buffered. The second child video content is played for a fourth play duration 712. Upon the end of fourth play duration 712, the playing of the parent video content resumes for a play duration 714. Offset periods 706, 710 facilitate a seamless or near seamless transition between parent and child video content.

The content switch can run a universal clock in the background as the parent video (2D video, for example) is being played on the hardware device. Content creators will decide when the additional content (360 degree video, 3D video, for example) will appear during the parent video playback and will insert this information into the child or additional content video metafiles, for example using a metadata authorship tool. There are multiple synchronization options as presented above.

Figure 11:
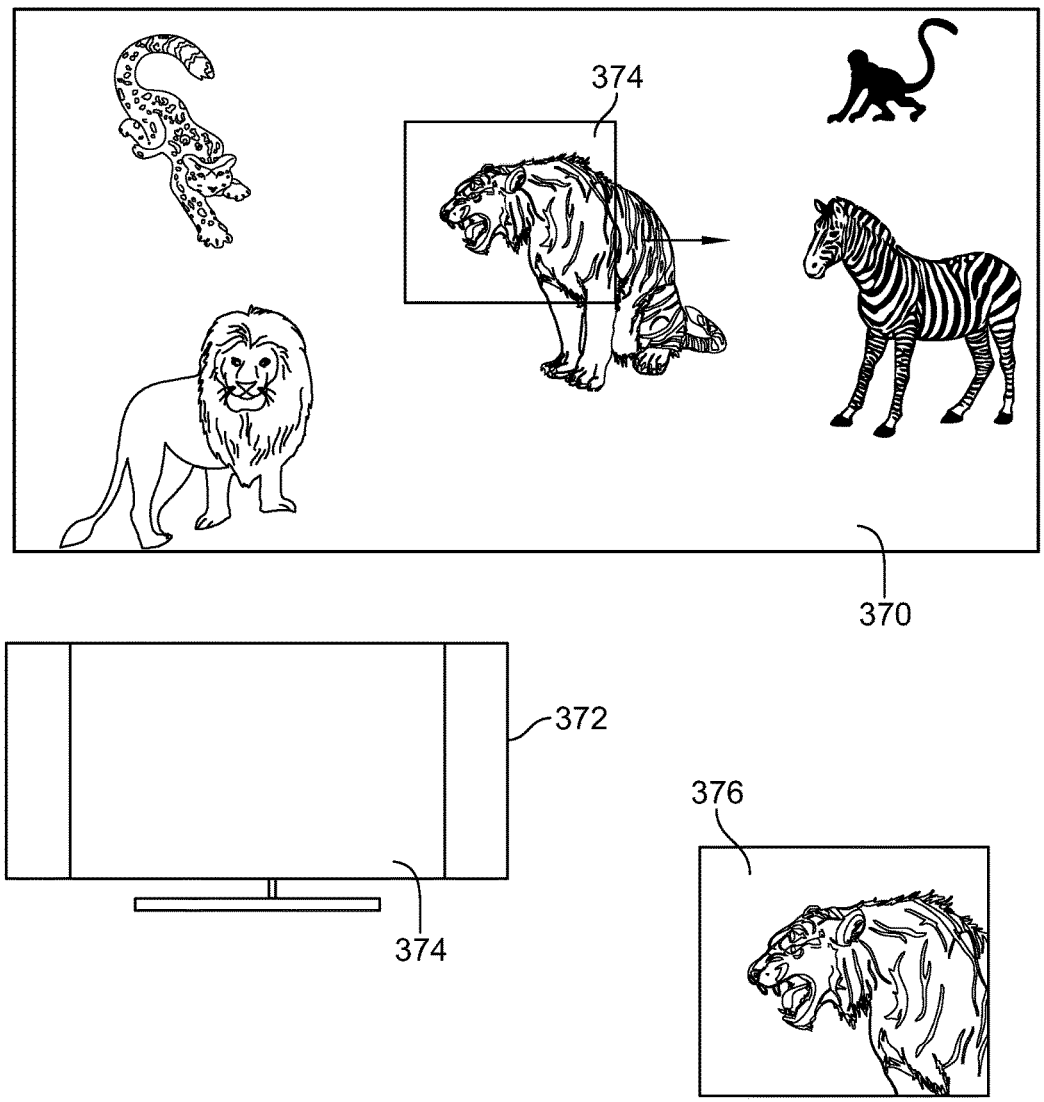
FIG. 11 is an example of an interface for controlling interactive content in a 360° panoramic video.

FIG. 11 is a schematic of an example of an interface for controlling interactive content according to an illustrative embodiment. In the example shown, a 360 degree panorama video 370 (e.g., panorama video, 360 degree interactive video, etc.) includes a 360 degree view of a scene. The panorama video can be captured using multiple video cameras arranged in an array. The images of the multiple cameras are stitched together to create a 360 video of the scene. A portion of panorama video 370 is displayed on a visual display 372, such as television set, computer monitor, laptop, digital billboard, projector, mobile device, tablet, digital photo frame, digital video frame, and/or any other display. Because most visual displays 372 are roughly two dimensional, the display output 374 at any moment may include just a portion of the panorama video. A viewer can use a control device, such as a remote control, touch pad, mobile device, mouse, motion-based controller, infrared remote control device, or any other suitable device, to move around panorama video 370. The viewer can control the geospatial imagery of the display 376 using the control device.

Returning to FIG. 7, a schematic of an example of an interface for controlling interactive content according to various embodiments is shown. In the example shown, a portion of the panorama video 380 that is displayed to the user is controlled using a control device 386 (e.g., a mobile device). A first portion 382 of the panorama video is displayed prior to the directional input includes video of a first area within the panorama scene. In the example shown, the first area includes a number of animals. Directional input to move the camera to the right is received at an external device 386. The directional input can include tactile input towards the right on a touch interface of a mobile device 386, for example, or other input devices compatible with the system. Based on the directional input, the display output is moved to the right to a second portion 384 of the panorama video display. The second portion 384 of the video display is displayed on the visual display (e.g., a television, mobile device, tablet, etc.). In the example shown, the second portion 384 of the panorama video includes a zebra. The display output may smoothly transition from the first display output 382 to the second display output 384. In certain cases, the display may move in proportion to the viewer's tactile input on the external device 386. Using this approach, a user may control the geospatial imagery of the display output using tactile input to view any portion of the panorama video 380. A further example of one of many alternative control devices that may accept directional input is shown as control device 390.

In various embodiments, a variety of remote tactile directional inputs can be input on the external device 386. Directional input (e.g., up, down, right and left) input to the control device 386 can be sent as a signal to a receiver associated with a display, such as a video streaming video player interfaced with a television, tablet, mobile device, billboard, and the like. The receiver may be wirelessly paired to the control device 386 via, for example, a Bluetooth, Near Field Communications (NFC), infrared, Wi-Fi, or other connection. The directional input signal is processed to move the portion of the panoramic video or image showing on the visual display. By way of example, if a user holding the remote device presses and holds an UP button on the control device 386, the 2D image on the television set would move up in the 360 degree panorama image. In illustrative examples, a user may navigate a street view type interface with live action video.

Returning to FIG. 8, a control device 810 for controlling interactive content according to various embodiments is shown. The gyroscopic sensors, accelerometers, or other sensors [not pictured] of a control device 810 may be used to control the display of the panoramic video. In illustrative embodiments, the orientation of control device 810 may be used to control the portion of the panorama video displayed. A gyroscope sensor in control device 810 may measure the orientation of the device, and the measured orientation generates output to control the geospatial perspective of the panoramic video. In one example, rotation about a first axis (a pan axis) rotates the geospatial perspective of the camera laterally or horizontally. Rotation about a second axis (a tilt axis) rotates the geospatial perspective vertically. In some instances, acceleration, translation, or movement of the device is used to control the portion of the panorama video displayed. Movement of the device, such as movement along the x-axis, y-axis and z-axis of the device can be used to orient the geospatial perspective of the panoramic video.

Figure 12:
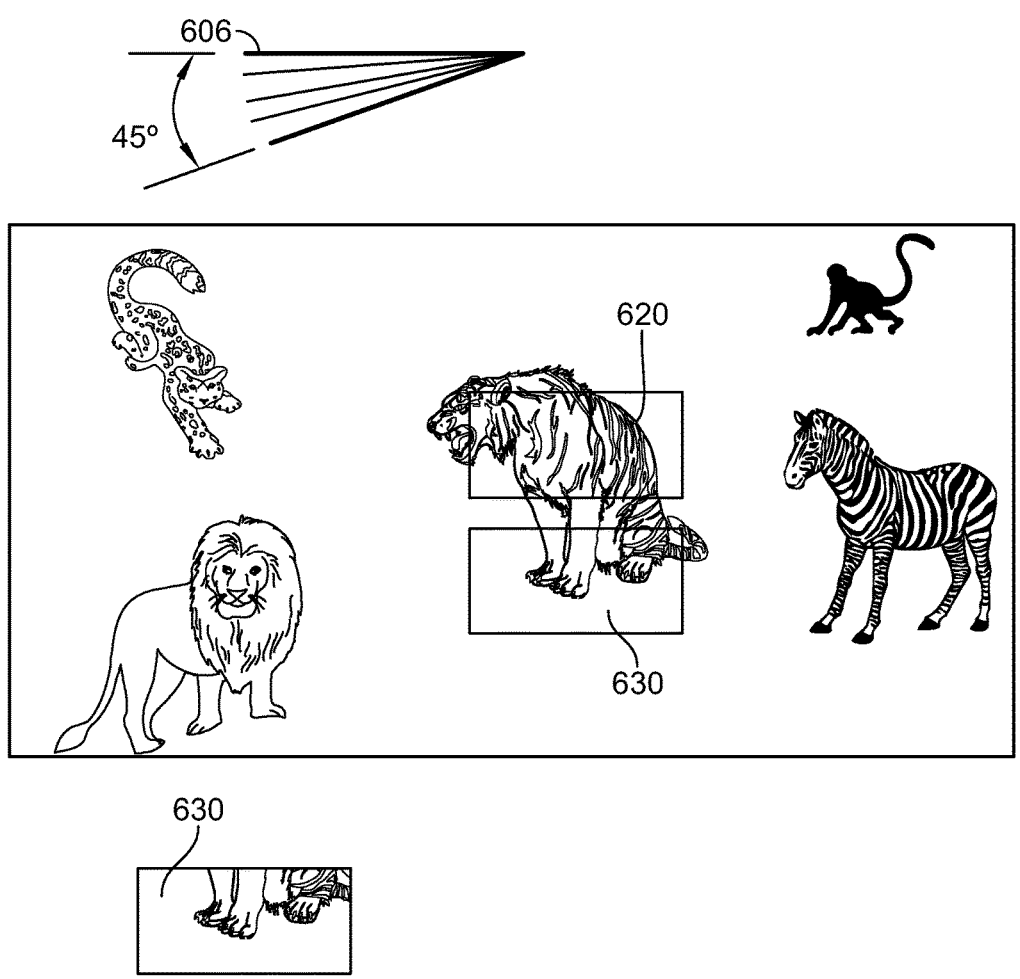
FIG. 12 is a further example of an interface for controlling interactive content comprising a 360° panoramic video.

FIG. 12 is a schematic of an illustrative control device 606 for controlling interactive content according to various embodiments. Control device 606 (e.g., mobile phone, remote, etc.) is tilted to control a geospatial perspective in a panoramic video. Control device 606 may, for example, be tilted down by 45 degrees relative to the surface of the earth or another reference frame. In response, the panoramic display may rotate from a first display output 620 to a second display output 630 that is 45 degrees vertically down. The user may tilt control device 606 up 45 degrees to return to the first display output 620. In another example, the viewer may rotate control device 606 or tilt control device 606 along a different axis to explore other regions of panoramic video 620. A panoramic video 620 may capture imagery in all directions, i.e. over a 360 degree view. In the example shown, an array of cameras may be placed in a center of a scene. The array of cameras may each point in different directions capturing a portion of the 360 degree geospatial surrounding environment. The video or images captured by each of the cameras are stitched together to create a composite panoramic video (or still image), and a user may orient their geospatial perspective using control device 606 to explore different regions of the panoramic video. Embodiments include any means for creating or capturing a panoramic still image or video.

FIG. 13 is a schematic of an interface for controlling interactive content and the associated schematic of a panoramic video 714, and portions 1-6. A control device 710 may present one or more directional inputs. Each of the directional inputs may orient the display output, change the orientation of the display output, or otherwise control the geospatial orientation in a predetermined manner. In one example, the direction inputs may include a pre-set angle of degrees on one or more axes, such as the x-axis, y-axis, or z-axis. The set degrees on a y-axis could be zero (starting position, image portion 1), 180 degrees on the y-axis (turn back, image portion 2). Negative 90 degrees on the y-axis (left turn, image portion 3), and 90 degrees on the y-axis (right turn, image portion 4). The set degrees on the x-axis could be 90 degrees on the x-axis (look up, image portion 5) and negative 90 degrees on the x-axis, image portion 6. In certain cases, the directional inputs are presented as buttons or icons 712 on a touch interface of control device 710, such as a mobile device. A user may press the buttons on the touch interface to navigate the panoramic video display in the predefined manner. Other input devices that are compatible with the switching system may also be used.

The above examples are a few of many possible interfaces and control techniques to alter the geospatial perspective of the panoramic video. A person of ordinary skill in would appreciate that other control techniques and devices may be used to manipulate a panoramic video display.

In further illustrative embodiments, advertising video content allows a user to switch to other video content format, including allowing a user to choose their own adventure. The 2D/360 degree video content switching methods and systems described herein can be used to combine the two formats in advertising video content. A software development kit (SDK) is provided for implementing the content switching between two or more video content formats. The SDK contains logic for content switching, retrieving and delivery and a 360 degree video player, although video content could be played from a separate 360 video player. It can be configured to be a turnkey solution to play advertising video content. The SDK provides the logic and metafile information for syncing different video content types without requiring changes to the mobile app or other application.

The SDK sets the policy elements or switching-related logic, including syncing metadata and video durations, for example. Accordingly the app responsibility is only to call the SDK at the appropriate moment. When 360 degree video content is detected, the SDK shows the option to switch to the 360 degree content. This means that a user's app responsibility is only to call the SDK at the right moment, i.e. when a slot for playing 360 degree video ads comes up.

Various ad formats can be used. In an illustrative embodiment Video Ad Serving Template (VAST) 3.0 is employed. This can be integrated with an ad network server such as Freewheel. Freewheel, or other ad network server, integration can be used, and can be facilitated by using VAST 3.0 format or other template to play the content and "abuse" Ad Pods for 360 degree video (this can be configured differently if needed). Advertising management campaign and trafficking software, such as AdS erver, can be run in the system infrastructure and be connectable to an ad network server, such as Freewheel, for additional inventory and to pull in 360 degree videos, or the inventory can fill up directly in the ad network server.

In an illustrative embodiment Ad Pods, or another set of sequential linear ads that can play before, during a break in, or after the content video plays, are employed to specify a plurality of ad elements that can be configured to play consecutively within an ad break, or multiple ad breaks. Ad Pods can be configured from VAST 3.0 compliant ad networks and passed to a player. Embodiments of the system thus have a video player that "abuses" Ad Pods from VAST 3.0 specification and considers sequence as the ad alternative in 360 degree video format. When a player encounters Ad Pod, a second item in the sequence is considered 360 degree video and a 360 degree button appears. Illustrative platforms that can be used include, tvOS, iOS, Android and Web. Illustrative formats include HLS and MPEG-DASH.

Figure 14:
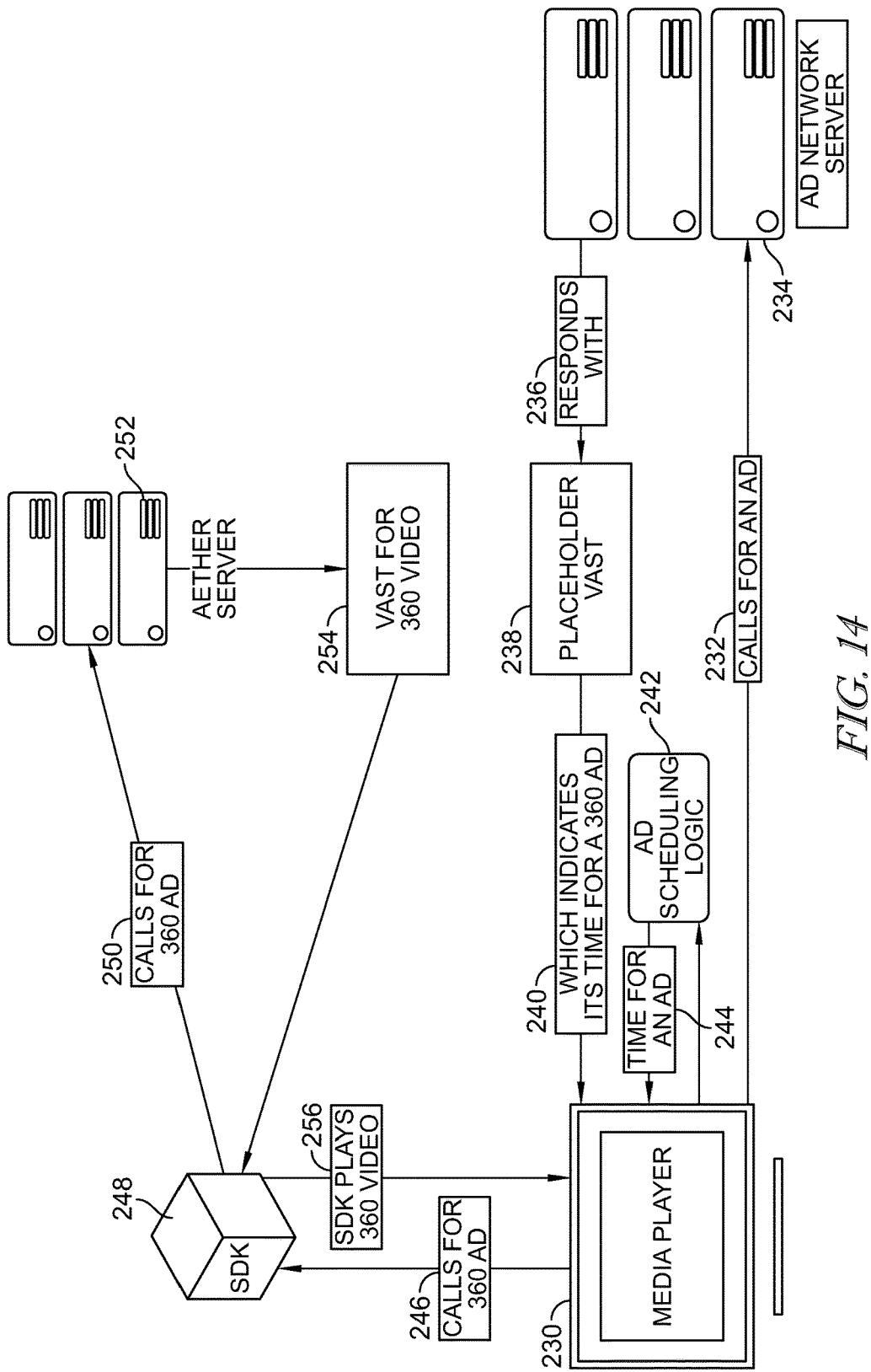
FIG. 14 is an illustrative diagram of a switching system and process that can be applied to advertising.

FIG. 14 is an illustrative diagram of a switching system and process to be applied to advertising, for example. A media player 230 calls for an advertisement from an ad server in block 232. The signal in received by an ad network server 234. Ad network server 234 responds in block 236 to a placeholder VAST containing values and parameters related to the switching between video formats in block 238. In block 240 a signal is being sent to media player 230 indicating it is time for the additional video content, such as the ad in 360 degree format. Ad scheduling logic in block 242 communicates to media player 230 when it is time for an ad to play, as depicted in block 244.

Continuing with reference to FIG. 14, in block 246 media player 230 calls for the 360 degree ad video from SDK 248. In block 250 the SDK calls for the 360 ad content from server 252. Server 252 then signals VAST for the 360 degree video in block 254. The content is then relayed to SDK 248. SDK 248 then sends the 360 degree video in block 256 for playing on media player 230. It is noted that any one or more of SDK 248 and content shown as being at server 252 as well as the server function can be located and carried out in the cloud.

In an illustrative embodiment, SDK 248 is configured to track the user's viewing position inside of the 360 ad playback, frequency of accessing the additional content and collect and export that data for target marketing purposes. This and additional information regarding the user's actions, preferences or other useful data for marketing purposes can be collected, sorted, compiled, exported and analyzed using algorithms embodying in the SDK, separate marketing software, or a combination. For example, if the viewer watches a car ad in 2D video and accesses the 360 video of the same ad, the viewer will be able to navigate inside of that car and see what the interior of the vehicle looks like. SDK 248 will then be able to track how much time the viewer spent "looking" at the dashboard versus the door of the car, for example. Also, the additional data can be collected for a particular viewer. If a viewer accessed additional 360 content of AD 1 (Audi commercial, for example) five times and spend over five minutes total in this AD 1; and in addition that same viewer accessed 360 additional content of AD 2 (BMV commercial, for example) only once and spent 20 seconds, SDK 248 can collect that information and export it as a data file, which can be relayed back to ad network server 234 server or directly to media player 230, if applicable. This information can also serve as input to additional marketing-related software for further action.

Figure 15:
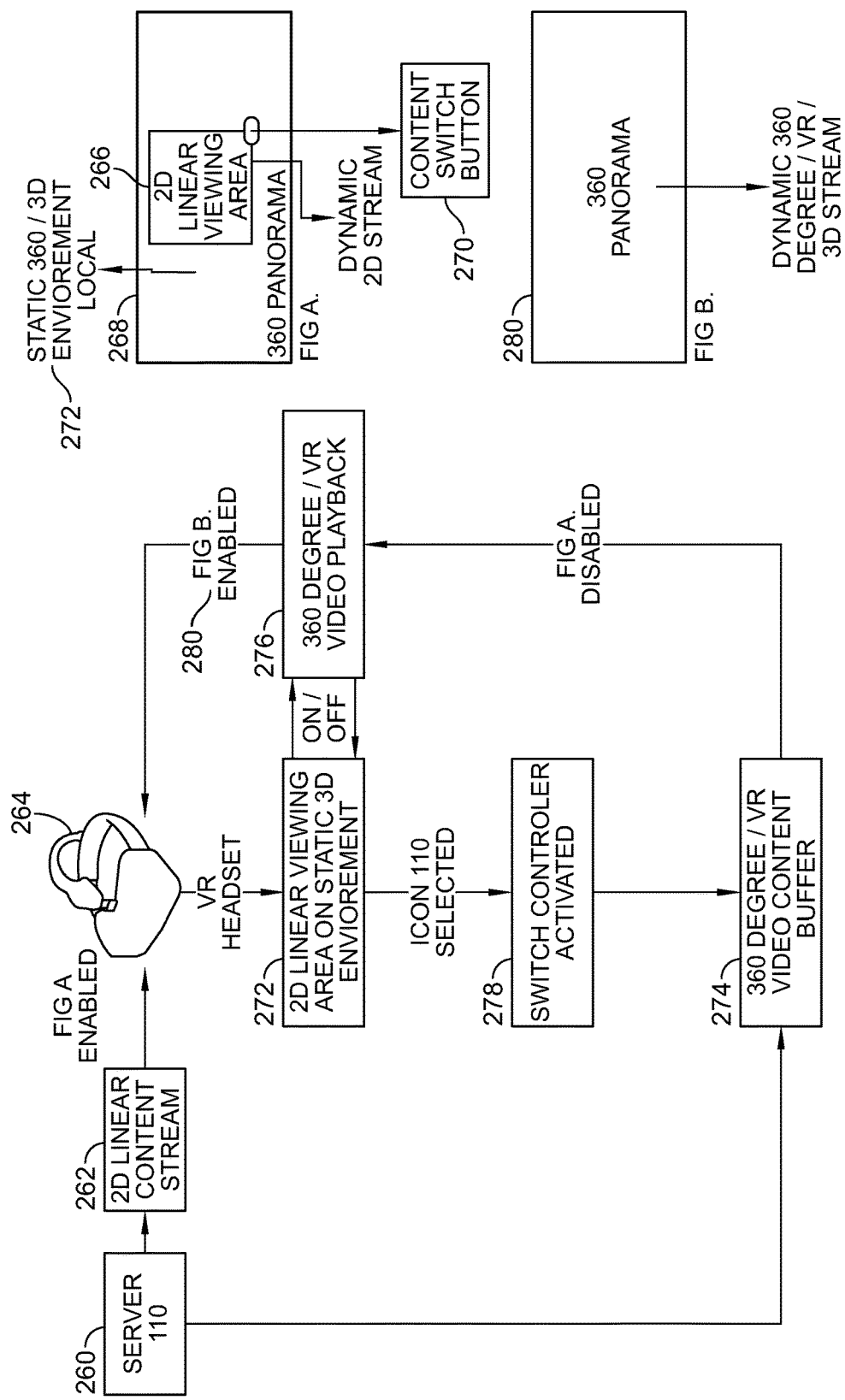
FIG. 15 is a schematic showing a content switch associated with a virtual reality headset.

FIG. 15 is a schematic showing a content switch associated with a VR headset. A content switch is performed inside of a VR headset where the initial feed is just a 2D video content showed and streamed on a constrained viewing area inside of local 3D environment (for example, a virtual living room). Once the content switch button is selected, the 2D viewing area and the local 3D environment is replaced by a full 360 degree or 3D/VR video content where viewing can receive the stream for the entire 360 degree environment. As with previous examples, the switch can go backward and forward. In block 262, server 260 feeds a 2D linear content to VR headset 264. 2D linear content stream 262 is enabled as shown in inset FIG. A. The 2D linear content stream is dynamic as it can be selected from a server. Inset FIG. A shows a 2D linear viewing area of panoramic video 268. Content switch button 270 can be used to select 2D linear video 266. A static 360/3D local environment is shown at 272. Returning to the VR headset 264 in FIG.15, it is shown that 360 degree/VR video content is retrieved from server 260 and buffering is performed in block 274. When the additional content is selected or otherwise initiated, a switch controller is activated in block 278 to prompt the video content switch. The 2D linear video is disabled according to FIG. A in block 276 to allow playback of the 360 degree and VR video. The additional content, such as 360/VR video is enabled as shown at 280 and FIG. B.

Figure 16:
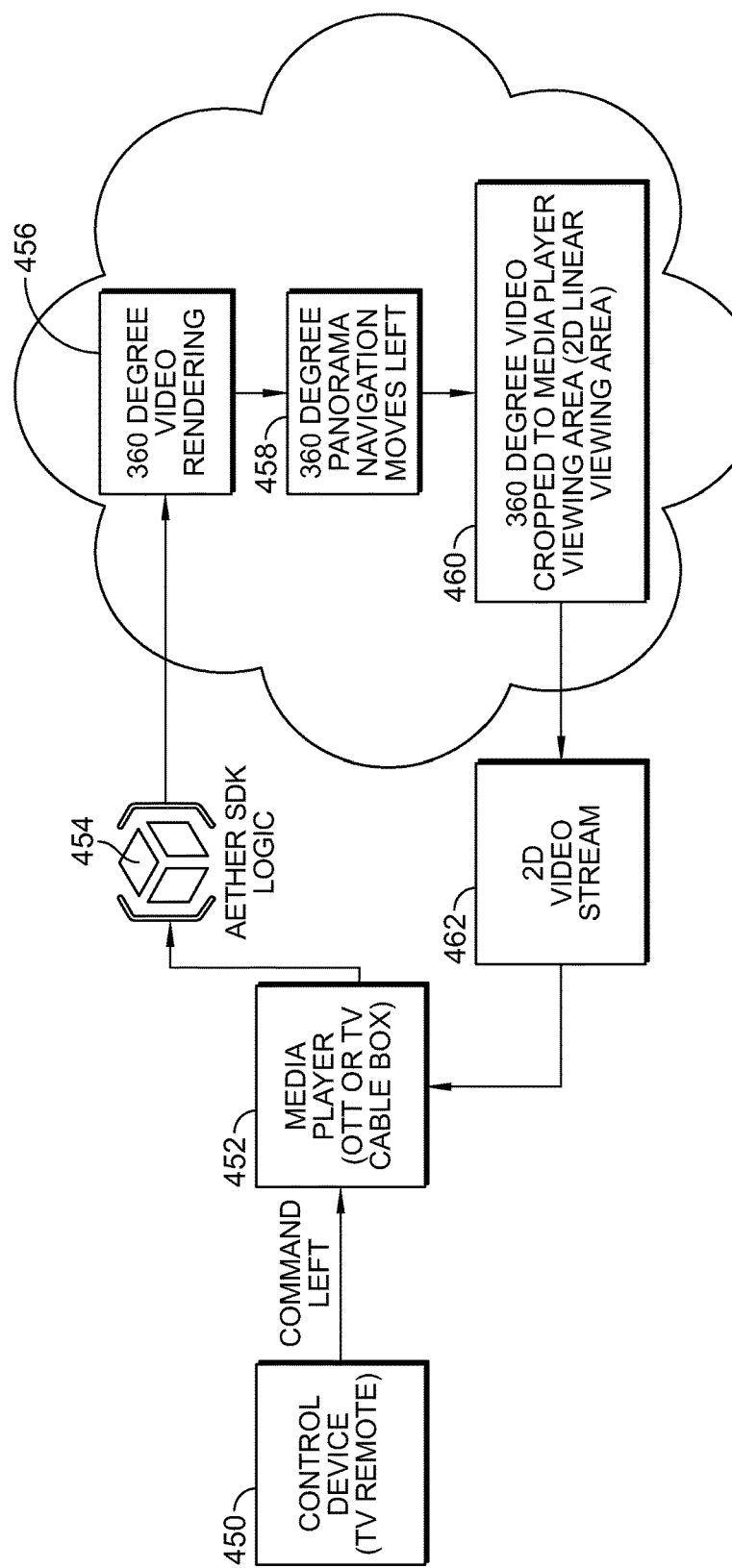
FIG. 16 depicts a video content type switching system and method operated in the cloud.

FIG. 16 depicts a video content type switching system and method operated in the cloud and wherein listening to a control device's function features (panoramic navigation, play, pause, etc.) from a media player can also be performed in the cloud. The system may perform all the rendering and functions in the cloud and only export 2D video stream. This way the media player box will not have to be configured or updated. The SDK logic will "trick" the media box (in this case a television cable box) to perform as though it is receiving and streaming just a regular 2D linear video. Therefore, the box will not know the difference, and even if it is not capable of rendering or 360 video playback, it will be able to playback interactive video content. As an example, legacy cable boxes whose processing power is not strong enough to render anything besides the 2D linear video can still be used by performing the rendering and related functions in the cloud. A control device 450 sends a command via an input signal to media player 452. Media player 452 sends the command information to the SDK 454. In block 456 SDK 454 provides instructions to render the 360 degree video to move as indicated by the control device, such as move left. In block 458 the 360 degree panorama is navigated according to the instructions, in this case by moving to the left. The 360 degree video is cropped to the media player viewing area in block 460, which in this illustrative example will to the 2D linear viewing area. This is then streamed as a 2D video stream in block 462 to media player 452. In this way, the initial 2D video content appears to have been transformed in a manner that a device with 360 degree video capabilities would require, however, only a 2D video device is employed by the user.

Unless specifically stated otherwise, throughout the specification discussions utilizing terms such as "processing," "computing," "calculating," "determining," or the like, refer to the action or processes of a computer or computing system, or similar electronic computing device, that manipulate or transform data represented as physical, such as electronic, quantities within the computing system's registers or memories into other data similarly represented as physical quantities within the computing system's memories, registers or other such information storage, transmission or display devices.

In a similar manner, the term "processor" may refer to any device or portion of a device that processes electronic data from registers or memory to transform that electronic data into other electronic data that may be stored in registers or memory. A "computing platform" may comprise one or more processors and/or databases.

Figure 17:
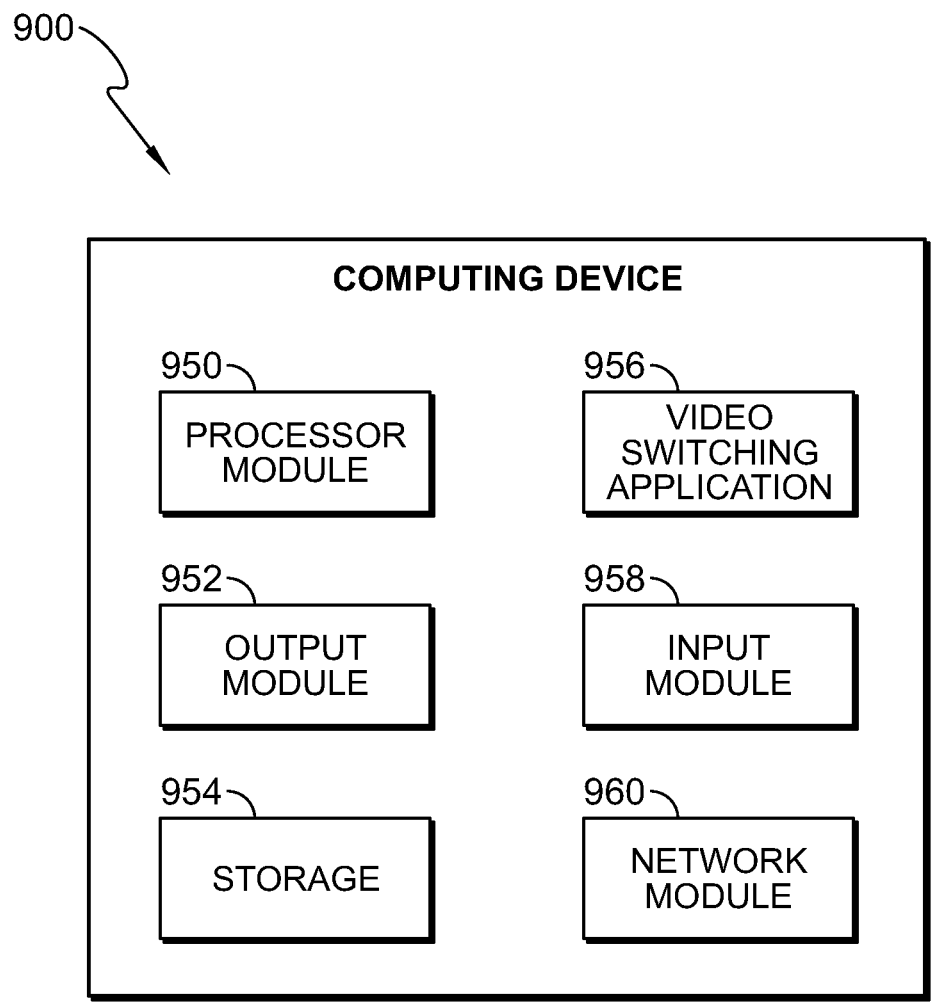
FIG. 17 is a schematic of a computing device.

FIG. 17 is a schematic of an illustrative computing device 900 that can be applied to embodiments of the invention. This illustrative embodiment includes a processor module 950, an output module 952, a storage module 954, a video switching application 956, an input module 958, and a network module 960. Processor module 950 may include one or more processors of any type that can execute any computer code and process signals according to the methods and devices disclosed herein. Output module 952 can include various displays, such as those embodied in televisions, smartphones, laptops, tablets, etc. and may include audio and video output. Input module 958 may include smartphone touch screens, television remote controls, video game controllers, keyboards, system specific control devices and other input devices compatible with and configured to work with the methods and systems described herein. Storage 954 may include any type of memory that can store the necessary information to execute the methods, save the data and otherwise serve as a computer readable medium to carry out the actions described herein. Network module 960 may include hardware and software to connect to a data network. Networks may be wireless, wired cellular Bluetooth, mobile or other form of network compatible with the systems and methods described herein. Additional modules may be incorporated in the system to carry out the functions disclosed herein, and some modules may not be included or may be combined into single modules.

Embodiments of the invention may include apparatuses for performing the operations herein. An apparatus may be specially constructed for the desired purposes, or it may comprise a general purpose device selectively activated or reconfigured by a program stored in the device.

Embodiments include the methods described herein and their equivalents, a non-transitory computer readable medium programmed to carry out the methods and an electronic system configured to carry out the methods. Further included is a video player comprising any of the embodiments described herein. The computer system, and any sub-computer systems include a machine readable storage medium containing an executable code; one or more processors; memory coupled to the one or more processors; an input device, and an output device connected to the one or more processors. Components of the system may part of a network. The systems and methods may include portions located in the cloud or other remote locations accessible by the systems or methods and incorporated therein.

Embodiments may be embodied in many different ways as a software component. For example, it may be a stand-alone software package, or it may be a software package incorporated as a "tool" in a larger software product, such as, for example, a media or video player. It may be downloadable from a network, for example, a website, or be a stand-alone product or an add-in package for installation in an existing software application. It may also be available as a client-server software application, or as a web-enabled software application. Embodiments include one or more computers specialized by storing programming logic that enables one or more processors to perform the techniques and methods described herein and their equivalents.

Although video content, video format, video file, video types, etc. have been referred to herein, the associated audio can be addressed in an analogous manner and may be included. So for example, where coding is referred to it includes video and audio coding if desired or appropriate.

Various embodiments of the invention have been described, each having a different combination of elements. The invention is not limited to the specific embodiments disclosed, and may include different combinations of the elements disclosed, omission of some elements or the replacement of elements by the equivalents of such structures.

While various embodiments of the invention have been described above, it should be understood that they have been presented by way of example only, and not limitation. Thus, the breadth and scope of the invention should not be limited by any of the above-described illustrative embodiments, but should instead be defined only in accordance with the following claims and their equivalents.

The invention claimed is:

1. A method for switching between different video content types in a content switch apparatus having a media player having two or more video players for playing different video formats including a parent video player to play parent video content and one or more child video players to play child video content, a memory and a processor communicatively coupled to the memory, wherein the processor is configured to execute steps comprising:
    activating a parent video player;
    detecting additional video content;
    matching the additional video content to the parent video content, wherein the matched additional content is a child video content of a different format from the parent video content;
    synchronizing the parent video content with the child video content;
    enabling a content switch button;
    running the child video content in the background;
    receiving input by a switch controller; and
    by the switch controller, based on the input, rotating the parent video player to the child video player.

2. The method of claim 1 further comprising:
    displaying the parent video content and the one or more child video content.

3. The method of claim 1 wherein the content switch apparatus, after receiving the input, further performs the method of:
    buffering the child video content while the parent video content continues to play; and
    switching to display the child video content only when the child video content is sufficiently buffered for display and playing the parent video content until such time.

4. The method claim 3 wherein buffering of the child video content is initiated as soon as the parent video content has been buffered.

5. The method of claim 1 further comprising a switching interface configured to switch between the parent video content and the child video content.

6. The method of claim 1 wherein the media player is configured to obtain video content in the different video formats from a server, the method further comprising:
streaming multiple video formats simultaneously from the server and temporarily storing them at the video player.

7. The method of claim 1 wherein the media player is configured to have the two or more video players active at the same time; the method further comprising:
presenting video by one of the two or more video players while one or more of the other two or more video players prepares video for playback or stand ready for playback.

8. The method of claim 1 further comprising:
determining by the content switch apparatus the type of video content and activating the appropriate player.

9. The method of claim 1 further comprising:
activating, by the content switch apparatus, features associated with the video format when switching to another video format.

10. The method of claim 1 performed with the parent video format in 2D linear and the child video format in 360 degree.

11. The method of claim 1 performed with the parent video format in 2D linear and the child video format in 3D.

12. The method of claim 1 comprising applying the method to live events.

13. The method of claim 1 wherein the parent video content is an advertisement.

14. The method of claim 1 comprising rendering the video in the cloud.

15. The method of claim 14 further comprising:
sending, by the content switch controller, a command to the media player;
sending, by the media player, the command to an SDK;
providing, by the SDK, instructions to render a child 360 degree video to move according to the command;
navigating the 360 degree video according to the command;
cropping the 360 degree video to a viewing area of the media player; and
sending the cropped 360 degree video as a 2D video to the media player.

16. The method of claim 1 comprising:
viewing the video content using a virtual reality headset.

17. The method of claim 1 further comprising:
with an SDK, tracking data including a viewer's actions and preferences;
exporting the tracked data; and
taking further marketing action based on the tracked data.

18. A computer readable non-transitory article of manufacture tangibly embodying computer readable instructions which, when executed, cause a computer to carry out the steps comprising:
activating a parent video player;
detecting additional video content;
matching additional video content to the parent video content, wherein the matched additional content is a child video content of a different format from the parent video content;
synchronizing the parent video content with the child video content;
enabling a content switch button;
running the child video content in the background;
receiving input by a switch controller;
by the switch controller, based on the input, rotating the parent video player to the child video player; and
displaying the parent video content and the one or more child video content.

19. The computer readable non-transitory article of manufacture of claim 18 wherein the content switch apparatus, after receiving the input, further performs the steps of:
buffering the child video content while the parent video content continues to play; and
switching to display the child video content only when the child video content is sufficiently buffered for display and playing the parent video content until such time; and
wherein buffering of the child video content is initiated as soon as the parent video content has been buffered.

20. The computer readable non-transitory article of manufacture of claim 18 wherein the media player is configured to obtain video content in the different video formats from a server, the steps further comprising:
streaming multiple video formats simultaneously from the server and temporarily storing them at the video player.

* * * * *

UNITED STATES PATENT AND TRADEMARK OFFICE
CERTIFICATE OF CORRECTION

PATENT NO. : 10,499,115 B2  
APPLICATION NO. : 16/018628  
DATED : December 3, 2019  
INVENTOR(S) : Nikola Todorovic and Tye Sheridan Page 1 of 1

It is certified that error appears in the above-identified patent and that said Letters Patent is hereby corrected as shown below:

On the Title Page

Item (73) the assignee name is changed from "Aether, Inc." to --Aether Media, Inc.--

Signed and Sealed this  
Fifth Day of May, 2020

Andrei Iancu  
*Director of the United States Patent and Trademark Office*